US009844226B2

(12) United States Patent
Futaki et al.

(10) Patent No.: US 9,844,226 B2
(45) Date of Patent: Dec. 19, 2017

(54) USE OF PEPTIDES FOR IMPARTING KOKUMI

(75) Inventors: Fumie Futaki, Kawasaki (JP); Reiko Yasuda, Kawasaki (JP); Seiichi Sato, Kawasaki (JP); Takashi Miyaki, Kawasaki (JP); Naohiro Miyamura, Kawasaki (JP); Yuzuru Eto, Kawasaki (JP)

(73) Assignee: AJINOMOTO CO., INC., Tokyo (JP)

( * ) Notice: Subject to any disclaimer, the term of this patent is extended or adjusted under 35 U.S.C. 154(b) by 0 days.

(21) Appl. No.: 13/249,523

(22) Filed: Sep. 30, 2011

(65) Prior Publication Data
US 2012/0034364 A1 Feb. 9, 2012

Related U.S. Application Data

(63) Continuation of application No. PCT/JP2010/055856, filed on Mar. 31, 2010.

(30) Foreign Application Priority Data

Apr. 1, 2009 (JP) ................................. 2009-089347
Dec. 22, 2009 (JP) ................................. 2009-291151

(51) Int. Cl.
*A23L 1/22* (2006.01)
*A23L 27/22* (2016.01)
*A23L 27/21* (2016.01)

(52) U.S. Cl.
CPC .............. *A23L 27/22* (2016.08); *A23L 27/21* (2016.08)

(58) Field of Classification Search
CPC ................................ A23L 27/22; A23L 27/21
USPC ....... 426/442, 534, 535, 536, 537, 538, 650; 532/565
See application file for complete search history.

(56) References Cited

U.S. PATENT DOCUMENTS

| 4,758,551 | A | 7/1988 | Meister et al. |
| 6,143,295 | A | 11/2000 | Jaeger |
| 6,348,335 | B1 | 2/2002 | Jaeger |
| 8,007,849 | B2 | 8/2011 | Pei et al. |
| 2003/0091721 | A1 | 5/2003 | Ohta et al. |
| 2007/0134389 | A1 | 6/2007 | Pei et al. |
| 2009/0239310 | A1 | 9/2009 | Ohsu et al. |
| 2009/0239808 | A1 | 9/2009 | Ohsu et al. |
| 2009/0246835 | A1 | 10/2009 | Iwatani et al. |
| 2010/0105864 | A1 | 4/2010 | Yoneda et al. |
| 2010/0120698 | A1 | 5/2010 | Nagasaki et al. |
| 2010/0136197 | A1 | 6/2010 | Eto et al. |
| 2010/0183792 | A1 | 7/2010 | Nagasaki et al. |
| 2011/0046046 | A1 | 2/2011 | Hara et al. |
| 2011/0070270 | A1 | 3/2011 | Kodera et al. |
| 2011/0097805 | A1 | 4/2011 | Ohsu et al. |

FOREIGN PATENT DOCUMENTS

| EP | 1803357 | 7/2007 |
| JP | 61-115464 | 6/1986 |
| JP | 62-25995 A | 2/1987 |
| JP | 04-091797 | 3/1992 |
| RU | 2148636 C1 | 5/2000 |
| WO | WO01/39613 | 6/2001 |
| WO | WO2007/055393 | 5/2007 |
| WO | WO2007/066430 | 6/2007 |
| WO | WO2008/139945 | 11/2008 |
| WO | WO2010/114022 | 10/2010 |

OTHER PUBLICATIONS

Cobb, Melanie H., et al., "Structural and Conformational Properties of Peptides Interacting with the Glutathione Receptor of Hydra," Mol. Pharmacol. 1982;21(3):629-636.
Nakayama, R., et al., "Synthesis of γ-Glutamylpeptides by γ-Glutamylcysteine Synthetase from *Proteus mirabilis*," Agric. Biol. Chem. 1981;45(12):2839-2845.
Ohsu, T., et al., "Involvement of the Calcium-sensing Receptor in Human Taste Perception," J. Biol. Chem. 2010;285(2):1016-1022.
Oppenheimer, L., et al., "Glutathione Synthetase," J. Biol. Chem. 1979;254(12):5184-5190.
International Search Report and Written Opinion for PCT Patent App. No. PCT/JP2010/055856 (dated Jul. 6, 2010).
Office Action from China Patent App. No. 201080024054.1 (dated Oct. 30, 2012) with English translation thereof.
Office Action from Taiwan Patent App. No. 10121227060 (dated Nov. 12, 2012).
Suzuki, H., et al., "Use of Bacterial γ-Glutamyltranspeptidase for Enzymatic Synthesis of γ-D-Glutamyl Compounds," Applied Environmen. Microbiol. 2003;69(11):6399-6404.
Official Action from Russian Patent App. No. 2011144143/10(066185), dated Dec. 26, 2012, with English translation thereof.
Notice of Reasons for Rejection from Japanese Patent App. No. 2011-507259 (dated Apr. 2, 2014) with English language translation thereof.
Decision on Grant of Patent for Invention for Russian Patent App. No. 2011144143 (dated Sep. 1, 2014) with English language translation thereof.
Koizumi, O., et al., "Reaction Chain in Feeding Behavior of Hydra: Different Specificities of Three Feeding Responses," J. Comp. Physiol. 1983;150:99-105.
Office Action from Chinese Patent App. No. 201080024054.1 (dated Aug. 21, 2013) with English language translation thereof.

*Primary Examiner* — Leslie Wong
(74) *Attorney, Agent, or Firm* — Shelly Guest Cermak; Cermak Nakajima & McGowan LLP

(57) ABSTRACT

A substance is described which is capable of imparting a kokumi, which shows a more excellent kokumi-imparting effect, in particular, the initial taste-imparting type of kokumi-imparting effect, which is excellent in the stability and which can easily be produced at a low cost. Additionally, a kokumi-imparting composition which includes a substance as well as a kokumi-imparting agent including the substance and other substances possessing the CaSR agonist activities in combination. More particularly, the present invention herein provides a kokumi-imparting composition consisting of γ-Glu-Abu (L-γ-glutamyl-L-2-amino-butyric acid) and a complex kokumi-imparting agent which includes the foregoing substance and another substance having a CaSR agonist activity, in combination.

14 Claims, 1 Drawing Sheet

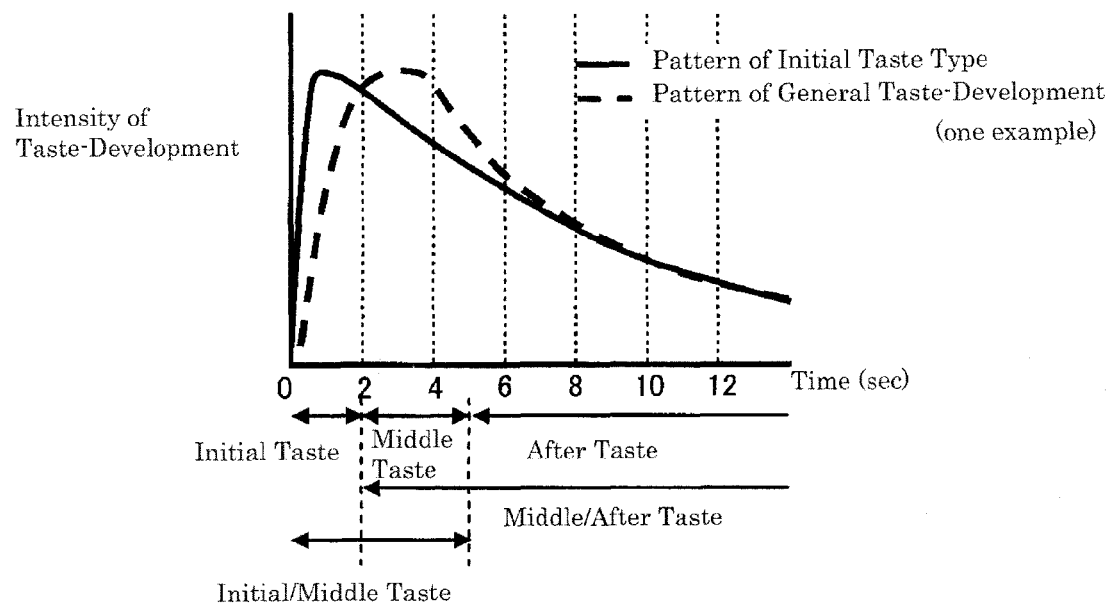

US 9,844,226 B2

USE OF PEPTIDES FOR IMPARTING KOKUMI

This application is a Continuation of, and claims priority under 35 U.S.C. §120 to PCT/JP2010/055856, filed Mar. 31, 2010, and claims priority therethrough under 35 U.S.C. §119 to Japanese Application No. 2009-089347, filed Apr. 1, 2009, and Japanese Application No. 2009-291151, filed Dec. 22, 2009, the entireties of which are incorporated by reference herein. Also, the entirety of the Sequence Listing filed electronically herewith is hereby incorporated by reference herein (File name: 2011-09-30T_US-469_Seq_List; File size: 27 KB; Date recorded: Sep. 30, 2011).

BACKGROUND OF THE INVENTION

Field of the Invention

The present invention relates to a kokumi-imparting agent and a kokumi-imparting composition, which includes a peptide having a CaSR agonist activity. Moreover, the present invention also relates to a composition, such as a seasoning composition, which includes a peptide having a CaSR agonist activity in a concentration of not less than a predetermined level.

Brief Description of the Related Art

The consumers' demands on the sense of taste of foods have recently increased due to, for instance, the diversity of the human eating habits. Therefore, there is an increased need for agents which can impart "kokumi". Conventionally, taste is described as five basic tastes, that is, sweet, salty, sour, bitter, and umami (deliciousness). However, there is an increased need for agents which can impart "kokumi", which further improves and intensifies the marginal tastes, that is, the thickness, the growth (or mouthfulness), the continuity and the harmony, of the foregoing five basic tastes.

The calcium sensing receptor (CaSR) can also be referred to as the calcium receptor; the signals outputted from the receptor can control a variety of biological functions within living bodies and substances possessing such a CaSR agonist activity can be used to impart kokumi (International Patent Laid-Open No. 2007/055393, Pamphlet, International Patent Laid-Open No. 2008/139945, and Journal of Biological Chemistry, (2010), 285 (2), 1016-22 as will be specified below).

A variety of taste patterns and profiles can be described as "kokumi". In this respect, there is an intensive need for the development of an agent which can impart kokumi to food at the initial taste. Moreover, the agent for imparting the kokumi would, in general, be used in, for example, foods and accordingly, it should have excellent stability. In addition, the substance for imparting the kokumi should be able to be easily produced at a low cost from the industrial standpoint.

Accordingly, a variety of compounds have been screened in the search for a compound with CaSR agonist activity, to thus find a substance capable of imparting a kokumi to other substance (foods or drinks), and which exhibits a more excellent kokumi-imparting effect, in particular, a kokumi-imparting effect of the initial taste-imparting type one, which is highly stable and which can easily be produced at a low cost, and to thereby provide a kokumi-imparting agent as well as a kokumi-imparting composition which includes the agent or substance and one or more other substances possessing the CaSR agonist activities in combination.

Some γ-glutamyl peptides that have a γ-glutamine residue at their N-terminal have been synthesized as substrates, for example, in the studies of the enzymatic activities (see International Patent Laid-Open No. 2007/066430, Pamphlet and Molecular Pharmacology (1982), 21(3), 629-36, Agricultural and Biological Chemistry (1981), 45(12), 2839-45, and Journal of Biological Chemistry (1979), 254(12), 5184-90, specified later). However, γ-Glu-Abu has never been disclosed as a kokumi-imparting agent or a seasoning or further, as an ingredient in a food. In this respect, the whole contents of International Patent Laid-Open No. 2007/055393, Pamphlet, International Patent Laid-Open No. 2007/066430, Pamphlet, and International Patent Laid-Open No. 2008/139945, Pamphlet are incorporated herein as references as if they were, in fact, expressly disclosed in this specification.

SUMMARY OF THE INVENTION

It is an aspect of the present invention to describe a method for searching for a variety of compounds possessing the desired CaSR agonist activity to thus find a substance capable of imparting a kokumi, which shows a more excellent kokumi-imparting effect, in particular, a kokumi-imparting effect at the initial taste. The substance is highly stable and can be easily produced at a low cost. A kokumi-imparting agent consisting of such a substance is described, as well as a kokumi-imparting composition which includes the substance and one or more other substances possessing the CaSR agonist activities in combination. It is a further aspect of the present invention to provide a seasoning composition that includes the foregoing substance in a concentration of not less than the predetermined level.

As a result of searching for a variety of compounds, it has been surprisingly found that γ-Glu-Abu (L-γ-glutamyl-L-2-aminobutyric acid) possesses a high CaSR agonist activity and a quite excellent kokumi-imparting effect and, in particular, the taste profile of this substance shows that kokumi can be imparted at the initial taste. Furthermore, it has been found that γ-Glu-Abu is highly stable and has a favorable taste pattern, namely the initial taste is stronger, as compared with those observed for γ-Glu-Cys. Moreover, γ-Glu-Abu is effective in imparting kokumi to foods either by itself, or as a part of a composition in combination with other substances which also have a CaSR agonist activity.

More specifically, it is an aspect of the present invention to provide a kokumi-imparting agent consisting essentially of γ-Glu-Abu.

It is a further aspect of the present invention to provide a kokumi-imparting composition comprising (a) γ-Glu-Abu and (b) a peptide selected from the group consisting of γ-Glu-X-Gly wherein X represents an amino acid or an amino acid derivative, γ-Glu-Val-Y wherein Y represents an amino acid or an amino acid derivative, γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met (O), γ-Glu-γ-Glu-Val, γ-Glu-Val-NH$_2$, γ-Glu-Val-ol, γ-Glu-Ser, γ-Glu-Tau, γ-Glu-Cys (S-Met) (O), γ-Glu-Leu, γ-Glu-Ile, γ-Glu-t-Leu, γ-Glu-Cys (S-Me), and combinations thereof.

It is a further aspect of the present invention to provide a kokumi-imparting composition comprising: (a) γ-Glu-Abu and (b) a peptide selected from the group consisting of: γ-Glu-X—OCH—(Z)—CO$_2$H, wherein X represents an amino acid or an amino acid derivative and Z represents a hydrogen atom or a methyl group; and γ-Glu-Val-Y, wherein Y represents GlyA or LacA.

It is a further aspect of the present invention to provide a seasoning composition comprising γ-Glu-Abu in an amount of not less than 1,000 ppm by mass.

It is a further aspect of the present invention to provide the seasoning composition as described above, comprising not less than 2,000 ppm by mass.

It is a further aspect of the present invention to provide the seasoning composition as described above, comprising not less than 2,500 ppm by mass.

It is a further aspect of the present invention to provide a method for the preparation of a food, drink, or an intermediate product which is useful for the preparation of a food or drink comprising A) adding an ingredient for a food or a drink, which comprises γ-Glu-Abu in an amount of not less than 1,000 ppm by mass, preferably 2,000 ppm by mass, more preferably 2,500 ppm by mass, to one or more other ingredients for foods and drinks, resulting in a mixture, and optionally cooking the mixture.

It is a further aspect of the present invention to provide a food or drink or an intermediate product used for the production of a food or a drink, prepared according to the above-described preparation method.

It is a further aspect of the present invention to provide a food or a drink or an intermediate product for the preparation of a food or a drink, which comprises γ-Glu-Abu in an amount ranging from 20 to 200 ppm by mass; an organic acid or salt thereof selected from the group consisting of lactic acid, citric acid, malic acid, succinic acid, and combinations thereof, and salts thereof in an amount ranging from 0.005 to 0.1% by mass; and common salt in an amount ranging from 0.01 to 0.5% by mass; as well as a carrier acceptable for foods and drinks, and/or at least one or two of ingredients for seasoning.

It is a further aspect of the present invention to provide a method for enhancing the flavor and/or the taste of a food or a drink, which comprises incorporating, into a food or a drink, a composition comprising γ-Glu-Abu in an amount of not less than 400 ppm by mass, preferably 1,000 ppm by mass, more preferably 2,000 ppm by mass, further more preferably 2,500 ppm by mass.

Effects of the Invention

The present invention provides a kokumi-imparting agent or composition which is quite excellent in its kokumi-imparting effect and, in particular, has an excellent and unique kokumi-imparting effect at the initial taste and having a profile as shown in FIG. 1, which is highly stable and can easily be prepared at a low cost. In addition, the present invention can likewise provide an excellent seasoning composition which includes a substance possessing an excellent kokumi-imparting effect in a concentration of not less than a predetermined level.

The kokumi-imparting agent according to the present invention has a taste pattern quite similar to that observed for common salt and therefore, when using the kokumi-imparting agent, the latter can impart, to a low salt food or the like, a salty taste and an initial taste-punch (or impact) to the low salt food. Accordingly, even when the salt content of the food is reduced, a salty taste similar to the original food can be maintained, and the produced food can be highly beneficial for health. Examples of such foods include a variety of soups and various kinds of sauces. Especially, if eating a food containing the kokumi-imparting agent according to the present invention, the consumer can feel the salty taste-like thick richness (thick impression) and an initial taste-punch (or impact) immediately after placing the food in the mouth.

BRIEF DESCRIPTION OF THE DRAWING

FIG. 1 shows the taste profile (taste pattern) observed for an initial taste type for the kokumi-imparting agent or composition.

DESCRIPTION OF THE PREFERRED EMBODIMENTS

The kokumi-imparting agent of the present invention can be γ-Glu-Abu. The kokumi-imparting agent needs to contain only γ-Glu-Abu from the viewpoint of the taste. The agent may contain other components, as long as there is no substantial influence on the taste.

The kokumi-imparting agent of the present invention or γ-Glu-Abu can also be used in combination with one or more additional ingredients to form a kokumi-imparting composition, such as amino acids such as sodium glutamate (MSG), nucleic acids such as inosine monophosphate (IMP), inorganic salts such as sodium chloride, organic acids such as citric acid, and various kinds of yeast extracts. Such compositions can more greatly improve the imparting of kokumi, as compared to the use of such additional ingredients individually. When using γ-Glu-Abu in combination with the foregoing additional ingredients for seasonings, the concentration of the latter can easily or properly be determined or established by one of ordinary skill in the art after conducting investigations through, for example, the sensory test.

The seasoning composition of the present invention, for example, one containing not less than 1,000 ppm by mass of γ-Glu-Abu, can likewise be combined with other ingredients for seasoning to thus provide a more favorable different seasoning.

In the present invention, the term "kokumi" means a taste which cannot be expressed by the five basic tastes, for example, sweet, salty, sour, bitter and umami, but refers to a taste which enhances the marginal tastes of the basic tastes, such as thickness, growth (mouthfulness), continuity, and harmony, as well as enhancing the basic tastes. In addition, "kokumi-imparting" refers to enhancement of any of the five basic tastes, sweet, salty, sour, bitter, and umami, while also imparting any of the marginal tastes, such as thickness, growth (mouthfulness), continuity and harmony. Moreover, this can also be referred to as a flavor-enhancing effect. Therefore, γ-Glu-Abu can likewise be referred to as a "flavor enhancer". γ-Glu-Abu may also be used as to enhance one or more of the five basic tastes, that is, sweet, salty, sour, bitter, or umami. Moreover, the taste of a food may vary over time after the food is placed in the mouth, and the tastes over time are generally referred to as the initial taste, the middle taste, and the after taste, in that order, immediately after the food is placed in the mouth. These concepts are relative to one another. In general, the initial taste, the middle taste and the after taste are defined to be the taste observed after 0 to 2 seconds, 2 to 5 seconds, and not less than 5 seconds, respectively, after placing the food in the mouth. In addition, the taste observed from 0 to 5 seconds can be referred to as the "initial/middle taste" and the taste observed from 2 to about 30 seconds can be referred to as the "middle/after taste" (see the data in FIG. 1). When the taste is evaluated using the three subdivisions as described above, it is difficult for the panelists (the persons who eat the food to be examined) to concentrate their attention on the evaluation, so it is more common to use a test which is divided into two subdivisions.

The effects of a substance having a CaSR activity on the kokumi and the taste pattern can be confirmed by methods, for example, a sensory evaluation test, conducted by a human being. Examples of such a sensory evaluation include those illustrated in the Examples, but are not limited thereto.

The term "CaSR" can mean the calcium sensing receptor, which belongs to the class C 7 transmembrane receptors, and which is also called the "calcium receptor". The term "CaSR agonist" can mean a substance that binds to the CaSR to thus activate the receptor. In addition, the term "activate CaSR" can mean that a ligand binds to the CaSR, activates the guanine nucleotide-binding protein, and causes signals to be transmitted. Moreover, the property of binding to the CaSR and activating the CaSR is referred to as the "CaSR agonist activity".

Now, a method for screening for a compound having a CaSR agonist activity is specifically described below, but is not limited to these steps.
1) adding a test substance to a system for measuring the CaSR activity and determining the CaSR activity;
2) comparing the CaSR activity when the test substance is added versus when it is not added; and
3) selecting the test substance with CaSR agonist activity.

The measurement of the CaSR activity can likewise be determined using, for example, cells able to express the CaSR. The chosen cells can endogeneously express the CaSR, or can be recombinant cells into which the gene expressing the CaSR is exogeneously introduced. The system for measuring the CaSR activity can be any suitable system, and is not restricted to any specific one, as long as it is capable of either detecting the bond (or a reaction) between a CaSR-specific extracellular ligand (activating substance) and the CaSR, or transmitting a detectable signal in response to the formation of the bond (reaction) between the activating substance and CaSR, when the activating substance is added to the foregoing cells which express the CaSR. If CaSR activity is detected through the reaction with a test substance, the test substance is determined to have CaSR-stimulating activity.

An example of the CaSR is human CaSR encoded by the human CaSR gene registered under the GenBank Accession Number of NM_000388. However, the CaSR is not limited to the protein encoded by the gene having this sequence. As long as the encoded protein has the CaSR function, it can be any protein having a homology of not less than 60%, preferably not less than 80%, and more preferably not less than 90%, with the foregoing gene sequence. The CaSR function can be investigated by expressing the gene in a cell, and measuring the change in the electric current, and/or the change in the intracellular calcium ion concentration when calcium is added to the cells.

The origin of the CaSR is not particularly limited, and examples include not only the above-described human CaSR, but also the CaSR derived from other animals including mice, rats and canines.

As described above, the CaSR activity can be confirmed by using living cells capable of expressing CaSR or a fragment thereof, a cell membrane expressing the CaSR or a fragment thereof, or an in vitro system containing the CaSR or a fragment thereof, or the like.

An example in which living cells are used is provided below, but the present invention is not limited to this example.

The CaSR is expressed in cultured cells such as *Xenopus laevis* oocytes, hamster ovarian cells, or human embryonic kidney cells. Expression of the CaSR can be carried out by cloning a CaSr gene into a plasmid, or by introducing a cRNA containing a plasmid containing the CaSR gene. The reaction can be detected by electrophysiological means or a fluorescent indicator that indicates an increase in intracellular calcium concentration.

The expression of the CaSR can be first confirmed based on the response to the added calcium or a specific activator. Oocytes in which an intracellular electric current is detected in response to adding calcium in a concentration of about 5 mM or cultured cells in which the fluorescence of a fluorescent indicator are observed in response to the addition thereto can be used. The concentration dependence can be measured by changing the calcium concentration. Next, a test substance is prepared in a concentration of about 1 µM to 1 mM, and added to oocytes or cultivated cells. Then, the CaSR activity is measured in the presence of the test substance to determine the CaSR agonist activity of the test substance.

More specific examples of tests for the determination of the CaSR agonist activity include those described in the Test Examples herein, but the test for CaSR agonist activity is not limited thereto.

The amino acids or peptides which can be used in the kokumi-imparting composition in combination with γ-Glu-Abu include, for example, one or at least two amino acids or peptides such as γ-Glu-Abu and γ-Glu-X-Gly (wherein X represents an amino acid or an amino acid derivative), γ-Glu-Val-Y (wherein Y represents an amino acid or an amino acid derivative), γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met (O), γ-Glu-γ-Glu-Val, γ-Glu-Val-NH$_2$, γ-Glu-Val-ol, γ-Glu-Ser, γ-Glu-Tau, γ-Glu-Cys (S-Me) (O), γ-Glu-Leu, γ-Glu-Ile, γ-Glu-t-Leu and γ-Glu-Cys (S-Me). The amino acids can include, for example, neutral amino acids such as Gly, Ala, Val, Leu, Ile, Ser, Thr, Cys, Met, Asn, Gln, Pro, Hyp, t-Leu; acidic amino acids such as Asp, Glu; basic amino acids such as Lys, Arg, His; aromatic amino acids such as Phe, Tyr, Trp; as well as homoserine, citrulline, ornithine, α-aminobutyric acid, norvaline, norleucine, and taurine. Moreover, the amino acids can also be artificial amino acids (having non-proteinaceous construction) such as tert-leucine, cyclo-leucine, α-aminoiso-butyric acid, L-penicillamine, allothreonine, and allo-isoleucine. In the peptide, γ-Glu-X-Gly, X may be any of the above-described amino acids or derivatives thereof, and preferred examples include amino acids or derivatives thereof other than Cys.

In addition, the amino acids or peptides used in combination with γ-Glu-Abu in the kokumi-imparting composition can be a peptide derivative having a structure represented by the formula: γγ-Glu-X—OCH—(Z)CO$_2$H, wherein X represents an amino acid or an amino acid derivative and Z represents H (hydrogen atom) or CH$_3$ (methyl group). Moreover, the amino acids or peptides may be a compound represented by the general formula: γ-Glu-Val-Y in which Y represents GlyA or LacA. Specific examples thereof include γ-Glu-Val-GlyA, γ-Glu-tLeu-GlyA, γ-Glu-Abu-GlyA, γ-Glu-Val-LacA, γ-Glu-tLeu-LacA and γ-Glu-Abu-LacA. The term "GlyA" can mean glycolic acid and LacA can mean lactic acid. Lactic acid may be either the S-isomer or R-isomer, but is preferably the S-isomer. The following are the structural formulas of these compounds:

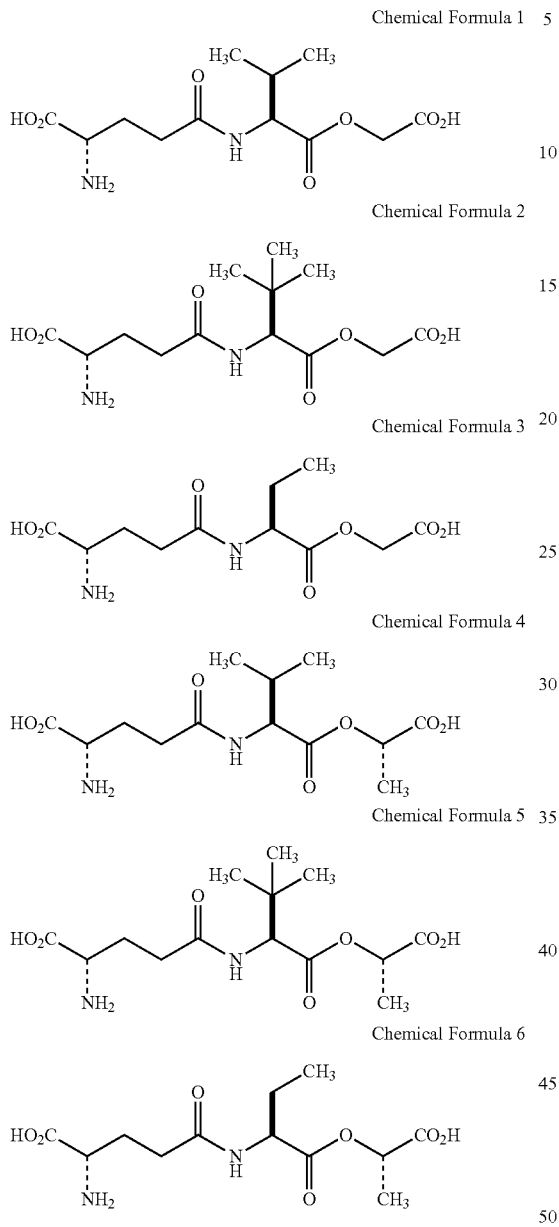

In particular, the kokumi-imparting agent can be γ-Glu-Abu, which has a unique and excellent initial taste kokumi-imparting effect having the profile as shown in FIG. 1. Accordingly, γ-Glu-Abu can be used in combination with a peptide that has a taste profile different from its own, such as γ-Glu-Val-Gly, for example.

The amino acid residues can be indicated by the following abbreviations:
(1) Gly: glycine;
(2) Ala: alanine;
(3) Val: valine;
(4) Leu: leucine;
(5) Ile: isoleucine;
(6) Met: methionine;
(7) Phe: phenylalanine;
(8) Tyr: tyrosine;
(9) Trp: tryptophane;
(10) His: histidine;
(11) Lys: lysine;
(12) Arg: arginine;
(13) Ser: serine;
(14) Thr: threonine;
(15) Asp: aspartic acid;
(16) Glu: glutamic acid;
(17) Asn: asparagine;
(18) Gln: glutamine;
(19) Cys: cysteine;
(20) Pro: proline;
(21) Orn: ornithine;
(22) Sar: sarcosine;
(23) Cit: citrulline;
(24) N-Val: (or Nva): norvaline (2-aminovaleric acid);
(25) N-Leu (or Nle): norleucine;
(26) Abu: α-aminobutyric acid;
(27) Tau: taurine;
(28) Hyp: hydroxy-proline;
(29) t-Leu: tert-leucine;
(30) Cle: cyclo-leucine;
(31) Aib: α-amino-isobutyric acid (2-methyl-alanine);
(32) Pen: L-penicillamine;
(33) allo-Thr: allothreonine;
(34) allo-Ile: allo-isoleucine.

Furthermore, the "amino acid derivative" can mean various derivatives of these amino acids, and specific examples include special amino acids, non-naturally occurring amino acids, amino alcohols, substituted derivatives in which terminal carbonyl groups, terminal amino groups, amino acid side chains such as a thiol group of cysteine are substituted with various kinds of substituents. Examples of such substituents include alkyl groups, acyl groups, hydroxyl groups, amino groups, alkylamino groups, nitro groups, sulfonyl groups, various protective groups, and the like. Examples of the substituted derivatives include Arg ($NO_2$): N-γ-nitro-alginine, Cys (SNO): S-nitro-cysteine, Cys (S-Me): S-methyl cysteine, Cys (S-allyl): S-allyl cysteine, Val-$NH_2$: valine-amide, and Val-ol: valinol (2-amino-3-methyl-1-butanol), and the like. The peptide: γ-Glu-Cys(SNO)-Gly is represented by the following structural formula, and the symbol: "(O)" in the foregoing formulas: γ-Glu-Met (O) and γ-Glu-Cys (S-Me) (O) means a sulfoxide structure. The symbol "(γ)" means that another amino acid is bonded to the glutamic acid through the carboxyl group at the γ-position of glutamic acid.

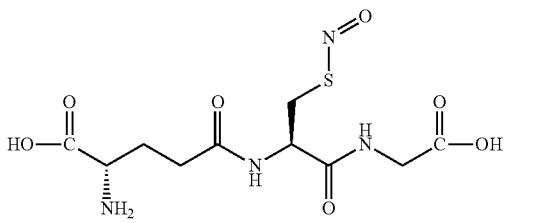

S-Nitrosoglutathione (GNSO)

The γ-Glu-Abu can mean L-γ-glutamyl-L-2-aminobutyric acid. The γ-Glu-Abu and the amino acids and peptides can be commercially obtained, or can be obtained by known techniques such as (1) chemical synthesis methods or (2) a enzymatic reaction synthesis method, although the chemical synthesis is usually easier. Because the γ-Glu-Abu has only two amino acids, it is usually more convenient to prepare it by chemical synthesis. Accordingly, γ-Glu-Abu can be easily produced at a lower cost than tripeptides, and hence is advantageous from an industrial standpoint. In addition, when chemically synthesizing the γ-Glu-Abu and/or the amino acids and peptides used in combination therewith, a peptide synthesizer can be used for the synthesis or semi-synthesis. Examples of chemical synthesis methods include the solid-phase peptide-synthesis method, and the like. The thus synthesized peptide can be purified by a known procedure, for example, by ion-exchange chromatography, reversed phase high performance liquid chromatography, or affinity chromatography. The solid phase peptide-synthesis technique and the subsequent peptide purification are well known in this technical field.

When producing the γ-Glu-Abu and the amino acids and peptides used in combination therewith via an enzymatic reaction, for example, the method described in International Patent Laid-Open WO 2004/011653 can be employed. More specifically, γ-Glu-Abu and the amino acids and peptide can be prepared by reacting one amino acid or a dipeptide which has an esterified or amidated terminal carboxyl group with another amino acid having a free amino acid, for example one whose carboxyl group is protected, in the presence of a peptide-forming enzyme, and then purifying the resulting dipeptide or tripeptide. Examples of the peptide-forming enzyme can include a microorganism culture capable of forming a peptide, a microorganism isolated from the culture, a treated cell product of the microorganism, or a peptide-forming enzyme derived from the microorganism.

In addition, the peptides can occur in, or naturally derive from plants, such as vegetables and fruits, microorganisms such as yeast, and other natural products. In such a case, the naturally occurring peptides extracted therefrom can be used, in addition to those obtained by chemical or enzymatic synthesis methods.

The kokumi-imparting agent or the kokumi-imparting composition can be used as a seasoning by itself, or after being mixed with carriers acceptable for foods and drinks, or other ingredients for seasonings. Examples of such other ingredients include flavors, saccharides, sweeteners, dietary fibers, vitamins, amino acids such as sodium glutamate (MSG), nucleic acids such as inosine monophosphate (IMP), inorganic salts such as sodium chloride, and organic acids such as citric acid or salts thereof as well as various yeast extracts.

The kokumi-imparting agent or the kokumi-imparting composition can be added to low salt foods, such as those containing common salt and, in particular, those with reduced salt content. The low salt foods include not only those in the solid form, but also those in the liquid form, and the term "low salt food" is synonymous with the "low salt food and drink".

Examples of such low salt foods include dairy products such as butter and cheese; foods containing animal oils and fats and/or vegetable oils and fats, such as margarine, sauces and roux; emulsified foods such as dressings and mayonnaise; various kinds of curries and stews; various kinds of snack foods; and a variety of soups containing meat extracts or cream, and the like. Moreover, other examples of low salt foods include fermented foods such as soybean paste and soy sauce; soups or broths and sauces obtained from fermented foods; processed vegetable such as salted vegetables and pickles; processed meat products such as hams and sausages; processed fishery products such as boiled fish pastes, dried fish, and simmered fishery products (Tsukudani); cooked meat balls, hamburger steak; fried foods; grilled chicken, and the like. Of these low salt foods, those having a common salt content of 0.01 to 0.5% by mass when eaten are exemplary. Moreover, organic acids such as lactic acid, citric acid, malic acid and succinic acid, and salts thereof in combination with common salt, in an amount ranging from 0.005 to 0.1% by mass are also exemplary. The use of these ingredients in combination further improves the salty taste-enhancing effect of the γ-Glu-Abu.

A food or drink which includes 20 to 200 ppm by mass of γ-Glu-Abu and 0.01 to 0.5% by mass of common salt is also provided. In this respect, the food or drink can further include an organic acid such as lactic acid, citric acid, malic acid and succinic acid, and salts thereof in a concentration ranging from 0.005 to 0.1% by mass.

When the kokumi-imparting agent is added to the low salt foods as mentioned above, the consumer can feel or taste a salty thick impression and an initial taste-punch (or impact) at the initial stage once the food is placed in the mouth.

The γ-Glu-Abu and the amino acids or peptides used in combination therewith may be in their salt form. If the γ-Glu-Abu and the amino acids or peptides are in their salt form, any salt can be used as long as it is pharmacologically acceptable. Specific examples include ammonium salts, salts with alkali metals such as sodium and potassium, salts with alkaline earth metals such as calcium and magnesium, aluminum salts, zinc salts, salts with organic amines such as triethylamine, ethanolamine, morpholine, pyrrolidine, piperidine, piperazine and dicyclo-hexylamine, and salts with basic amino acids such as arginine and lysine, for the acidic groups such as carboxyl groups. Moreover, in the case of basic groups, examples include salts with inorganic acids such as hydrochloric acid, sulfuric acid, phosphoric acid, nitric acid and hydrobromic acid; salts with organic acids such as acetic acid, citric acid, benzoic acid, maleic acid, fumaric acid, tartaric acid, succinic acid, tannic acid, butyric acid, hibenzoic acid, pamoic acid, enanthic acid, decanoic acid, theoclic acid, salicylic acid, lactic acid, oxalic acid, mandelic acid and malic acid; and salts with organic sulfonic acids such as methanesulfonic acid, benzenesulfonic acid and p-toluenesulfonic acid.

The kokumi-imparting agent or the kokumi-imparting composition can be in any form, including dried powders, pastes, and solutions, without any restriction in the physical properties thereof.

The kokumi-imparting agent or the kokumi-imparting composition can be incorporated into, for example, foods, drinks and seasonings.

When incorporated into foods, drinks, and/or seasonings, the final amount of the γ-Glu-Abu and that of the amino acid or peptide used in combination therewith are not particularly limited as long as the desired effect can be achieved. The amount of γ-Glu-Abu and/or that of the amino acid or peptide can fall within from about 1 ppb by mass to 99.9% by mass, and preferably about 10 ppb by mass to 10% by mass, and more preferably about 1 ppm by mass to 1% by mass, based on the total mass of the food, drink, seasoning or the like.

A method for the preparation of a seasoning composition is provided, which can include the step of mixing the kokumi-imparting agent with a carrier acceptable for the ingredients for other seasonings or foods and drinks. The concentration of γ-Glu-Abu in the seasoning composition can be from 400 to 500,000 ppm by mass. In particular, the method for the preparation of a seasoning composition can include the steps of mixing the kokumi-imparting agent with the ingredients of another seasoning and controlling the concentration of γ-Glu-Abu in the seasoning composition to from 400 to 500,000 ppm by mass.

A method for the preparation of a food or drink is provided, which can include the step of incorporating the kokumi-imparting agent into another ingredient for a food or drink. The concentration of γ-Glu-Abu in the food or drink can be from 20 to 200 ppm by mass. Accordingly, the method can include the step of adjusting the concentration of γ-Glu-Abu in the food or drink to 20 to 200 ppm by mass.

The food, drink, seasoning, or the like, which includes the incorporated kokumi-imparting agent or kokumi-imparting composition, may be further blended with any solid or liquid carrier acceptable for foods or drinks, appropriate suitable seasoning ingredients, or the like.

Examples of carriers can include glucose, lactose, saccharose, starch, mannitol, dextrin, fatty acid glycerides, polyethylene glycol, hydroxyethyl starch, ethylene glycol, polyoxyethylene sorbitan fatty acid esters, gelatine, albumin, amino acids, water, physiological saline, and the like.

The above-described ingredients for seasoning are not particularly limited, and may be any seasoning typically used in this field. Specific examples include those described above.

The content of each carrier, other seasoning ingredients, or the like are not particularly limited.

The seasoning composition of the present invention can include γ-Glu-Abu in an amount of not less than 1,000 ppm by mass, preferably 2,000 ppm by mass and more preferably 2,500 ppm by mass, and hence the effect of γ-Glu-Abu on taste can be particularly perceived. The ratio of γ-Glu-Abu in the seasoning composition is preferably not less than 3,000 ppm by mass, more preferably 5,000 ppm by mass, further preferably not less than 1% by mass, particularly preferably not less than 3% by mass. Further, another example is a seasoning composition having a ratio of γ-Glu-Abu of not more than 99.9% by mass. The components of the seasoning composition other than γ-Glu-Abu are not particularly limited, and specific examples include carriers and seasoning ingredients, which are acceptable for foods and drinks.

More specific examples of the seasoning compositions of the present invention can include yeast extracts containing γ-Glu-Abu in an amount of not less than 2,500 ppm by mass. The yeast extract is not particularly limited in terms of the microorganisms from which the extract is derived, the conditions of cultivating the microorganisms, and the methods for the extraction thereof, and accordingly, any yeast extract can be used in the seasoning composition. Furthermore, these yeast extracts can be further subjected to, for example, a heat treatment, an enzyme treatment, concentration, and/or a granulating treatment, and the like. The method for preparing a yeast extract containing not less than 2,500 ppm by mass of γ-Glu-Abu is not particularly limited, and can be obtained by, for example, adding γ-Glu-Abu to a yeast extract so that the above concentration is achieved.

The seasoning composition can be used in any form, such as a dried powder, a paste, or a solution, without any limitation in the physical properties thereof.

The seasoning composition can be blended into, for example, foods, drinks, and the like.

A method for the preparation of a different type of seasoning composition, which can include the step of adding the seasoning of the present invention to other seasoning ingredients or a carrier acceptable for foods and drinks. The concentration of γ-Glu-Abu in the seasoning composition prepared according to this method can be from 400 to 500,000 ppm by mass. In particular, the method for the preparation of this type of a seasoning composition can include the steps of mixing the seasoning composition of the present invention with other seasoning ingredients, and then controlling the concentration of γ-Glu-Abu in this type of a seasoning composition to 400 to 500,000 ppm by mass.

A method for the preparation of a food or drink is also provided, which can include the step of incorporating the seasoning composition of the present invention into other ingredients used for preparing a food or drink. The concentration of γ-Glu-Abu in the food or drink thus prepared can be from 20 to 200 ppm by mass. In particular, the step for the incorporation of the seasoning composition of the present invention into other ingredients used for preparing a food or drink can include the step of adjusting the concentration of γ-Glu-Abu in the food or drink to from 20 to 200 ppm by mass.

A method for the preparation of, for example, a food, a drink, or a seasoning, can include the step of adding γ-Glu-Abu to an intermediate used for the production of a food, a drink or a seasoning, in a concentration of from 1 ppb by mass to 99.9% by mass. In this respect, the food, drink, seasoning or the like can be a low salt food.

A method for the preparation of a food or a drink is provided, which can include the step of adding the seasoning composition of the present invention into an intermediate used for preparing such a food or drink. In this connection, the food or drink can be a low salt food.

In the method for preparing a food or drink, or an intermediate used for the preparation of a food or drink, the aforementioned yeast extract containing γ-Glu-Abu in a high concentration can be used as an ingredient for preparing a food or drink, which contains not less than 1,000 ppm by mass of γ-Glu-Abu. An isolated γ-Glu-Abu obtained by a chemical or enzymatic synthetic method; or a diluted product of an isolated γ-Glu-Abu may be used as the ingredient for a food or drink. Examples of such diluted product containing γ-Glu-Abu include those obtained by diluting a raw material powder of γ-Glu-Abu with any of the above-described solid or liquid carriers acceptable for foods and drinks.

In the present invention, the phrase "another (or other) ingredient a food or drink" can be any ingredient for a food or drink, which is typically used as an ingredient for a food or drink, but which is other than the "ingredient for a food or drink containing not less than 1,000 ppm by mass of γ-Glu-Abu" and for example, can include not only those listed below as foods and drinks and intermediates for preparing them, but also the above-described acceptable carriers and ingredients for seasoning.

The method for preparing a food or a drink or an intermediate used for preparing the same can include the step of further cooking the resulting mixture of ingredients for a food or drink obtained by the step of adding the ingredient for a food or drink, which contains not less than 1,000 ppm by mass of γ-Glu-Abu, into the other ingredient for a food and drink. In this respect, the term "cooking" can include any cooking step commonly used in this field. Examples of such cooking steps can include roasting, baking, broiling, boiling, frying, steaming, cutting, crushing, smashing, grating, rubbing and grating, mashing, grinding and mashing, mincing, blending, sieving and pounding, but the cooking steps are not limited thereto.

Examples of the foods and drinks or the intermediates for preparing a food or drink, include those already listed above, for example, dairy products such as butter and cheese; foods containing animal oils and fats and/or vegetable oils and fats, such as margarine, sauces and roux;

emulsified foods such as dressings and mayonnaise; various curries and stews; various snack foods; and various soups containing meat extracts or cream, as well as fermented such as soybean paste and soy sauce; soups or sauces related to fermented foods; processed vegetables such as salted vegetables and pickles; processed meats such as hams and sausage; processed fishery products such as boiled fish pastes, dried fish, and simmered fishery products (Tsukudani); cooked meat balls and hamburger steak; fried foods; grilled chicken, and the like.

The food or drink of the present invention also can include foods, drinks, and the like as final products in a form that is sold on the market. The term "intermediates used for preparing foods and drinks" can mean products in a form which is exists prior to processing into a completed product. When using an intermediate containing γ-Glu-Abu as a seasoning ingredient, the γ-Glu-Abu can be present in the intermediate in an amount ranging from about 400 to 500,000 ppm by mass, and preferably about 4,000 to 40,000 ppm by mass. The intermediate product can be prepared, for example, by adding an ingredient for a food or drink containing not less than 1,000 ppm by mass of γ-Glu-Abu so that such concentration can be achieved. Moreover, when eaten, the final product preferably contains about 20 to 200 ppm by mass of γ-Glu-Abu. The final product can be prepared, for example, by adding an ingredient for a food or drink which contains γ-Glu-Abu in an amount of not less than 1,000 ppm by mass so that such a concentration can be achieved.

In the method for the preparation of a food or a drink, or an intermediate used for the production of a food or drink, the step of adding the ingredient for a food or drink, which contains γ-Glu-Abu, to the other ingredient for a food or drink preferably includes the step of adjusting the γ-Glu-Abu concentration of in the intermediate product to a level of 400 to 500,000 ppm by mass. More preferably, the method for the preparation of a food or a drink further includes the step of adding an intermediate used for the production of a food or drink to another ingredient for a food or drink, to thereby adjust the γ-Glu-Abu concentration in the food or drink to 20 to 200 ppm by mass.

In the method for preparing a food or a drink according to the present invention, the step of adding the ingredient for a food or drink, which contains γ-Glu-Abu, to the other ingredient for a food or drink preferably includes the step of adjusting the γ-Glu-Abu concentration of γ-Glu-Abu in the food or drink to 20 to 200 ppm by mass.

The method for the preparation of a food or a drink according to the present invention can be used in the case, for example, of a low salt food or drink. In this case, the method can include the step of adding at least one organic acid, such as lactic acid, citric acid, malic acid and succinic acid, and salts thereof, and preferably lactic acid and malic acid, so that the concentration thereof in the food or drink can be 0.005 to 0.1% by mass. Moreover, the method can include the step of adding common salt to the ingredient for a food or drink in an amount smaller than that when preparing food or drink without the above ingredients. In this respect, the term "small amount of common salt in a low salt food" can mean, for example, the common salt concentration in the low salt food of at least 5% and preferably at least 10% less than that typically used for that food or drink.

The food and drink can be provided in any form typically employed in food and drink industry. For example, the food or drink can be packaged in a retort container, canned or bottled forms, or in the form of dried products, or the like.

The present invention will hereunder be described in more detail with reference to the following non-limiting Examples.

EXAMPLES

Preparation of Various Samples:

The following four substances were used as purchased: γ-L-Glu-L-Abu (Abu: α-aminobutyric acid; available from Bachem Feinchemikalien AG); γ-L-Glu-L-Ala (available from Bachem Feinchemikalien AG); γ-L-Glu-L-Cys (available from Sigma Aldrich Japan Co., Ltd.); and γ-L-Glu-L-Thr (available from KOKUSAN Chemical Co., Ltd).

Synthesis of L-Glu-L-Val:

Step 1: Z-L-Glu-OBzl (N-α-carbobenzoxy-L-glutamic acid α-benzyl ester, 7.619 g, 20.51 mM) and Val-OBzl.HCl (L-valine benzyl ester hydrochloride, 5 g, 20.51 mM) were dissolved in methylene chloride (100 mL), and the solution was maintained at 0° C. Triethylamine (3.2 mL, 22.57 mM), HOBt (1-hydroxybenzo-triazole, 3.053 g, 22.57 mM) and WSC.HCl (1-ethyl-3-(3-dimethylaminopropyl) carbodiimide hydrochloride, 4.326 g, 22.57 mM) were added to the solution, and the mixture was stirred at room temperature overnight. The reaction liquid was then concentrated under reduced pressure and the residue was dissolved in ethyl acetate (220 mL). The solution was subjected to phase separation using a 5% aqueous citric acid solution (100 mL), and the aqueous layer was further subjected to extraction with ethyl acetate (60 mL). The organic layers were combined and then washed with saturated aqueous sodium chloride solution (80 mL), a 5% aqueous sodium hydrogen carbonate solution (80 mL), and saturated aqueous sodium chloride (80 mL). The organic layer was dried over anhydrous magnesium sulfate. The magnesium sulfate was removed by filtration, and the filtrate obtained was concentrated under reduced pressure. The residue was subjected to slurry washing with ethyl acetate/n-hexane (1:1), followed by filtration. Thus, Z-L-Glu-L-Val-OBzl (10.0273 g) was obtained. In addition, crystals precipitated by addition of n-hexane to the ethyl acetate-n-hexane fraction were recrystallized from ethyl acetate/n-hexane, and Z-L-Glu-L-Val-OBzl (1.0399 g) was obtained.

Yield: 94.25%.

Step 2: Ethanol (160 mL) was added to Z-L-Glu-L-Val-OBzl (11.71 g, 20.86 mM), and then 10% palladium carbon (2.3 g) and then water (10 mL) were added thereto. The mixture was stirred at room temperature overnight in a hydrogen gas atmosphere. During the reaction, water (100 mL) was added in small portions. The palladium carbon was removed by filtration, and the filtrate was concentrated under reduced pressure. The residue was recrystallized from a small amount of water and ethanol. Thus, γ-L-Glu-L-Val (5.0 g) was obtained.

Yield: 97.23%.

The properties of the product are as follows:

ESI-MS: m/z 247.2 $(M+H)^+$ $^1$H-NMR (400 MHz, $D_2O$): δ (ppm): 0.86 (3H, d, J=6.8 Hz), 0.88 (3H, d, J=6.8 Hz), 2.04-2.13 (3H, m), 2.42-2.46 (2H, m), 3.74 (1H, t, J=6.3 Hz), 4.13 (1H, d, J=5.8 Hz).

Synthesis of γ-L-Glu-L-Ser:

γ-L-Glu-L-Ser was synthesized according to the synthesis method for γ-L-Glu-L-Val by using Z-L-Glu-OBzl and L-Ser-OBzl as raw materials. The properties of the product are as follows:

ESI-MS: m/z 235.1 $(M+H)^+$ $^1$H-NMR (400 MHz, $D_2O$): δ (ppm): 1.98-2.09 (2H, m), 2.40 (2H, t, J=8.0 Hz), 3.71-3.81 (3H, m), 4.33 (1H, t, J=8.0 Hz).

Synthesis of γ-L-Glu-L-t-Leu:

γ-L-Glu-L-t-Leu was synthesized according to the synthesis method for γ-L-Glu-L-Val by using Z-L-Glu-OBzl and L-t-Leu-OBzl as raw materials. The properties of the product are as follows:

ESI-MS: m/z 261.3 (M+H)$^+$

Preparation of γ-L-Glu-Aib:

γ-L-Glu-Aib was synthesized according to the synthesis method for γ-L-Glu-L-Val by using Z-L-Glu-OBzl and Aib-Ot-Bu as raw materials. The properties of the product are as follows:

ESI-MS: m/z 233.3 (M+H)$^+$ $^1$H-NMR (400 MHz, D$_2$O): δ (ppm): 1.36 (6H, s), 2.00-2.06 (2H, m), 2.30-2.34 (2H, m), 3.69 (1H, t, J=6.2 Hz).

Test Example 1: Preparation of CaSR-Expression Plasmid

A CaSR-expression plasmid was prepared as follows:

Based on the DNA sequences (CaSR (calcium receptor): NM_000388, Sequence Nos. 1 and 2) registered at NCBI, synthetic oligo DNAs (a forward primer (Sequence No. 3: ACTAATACGACTCACTATAGGGACCATGGCA-TTT-TATAGCTGCTGCTGG) and a reverse primer (Sequence No. 4: TTATGAATT-CACTACGTTTTCTGTAACAG) used for PCR were synthesized.

PCR was carried out by using a human kidney-derived cDNA (available from Clontech Company) as a material, and by using the primers and Pfu Ultra DNA Polymerase (available from Stratagene Company) under the following conditions 94° C. for 3 minutes; then 35 cycles each of 94° C. for 30 seconds, 55° C. for 30 seconds, and 72° C. for 2 minutes, followed by a reaction at 72° C. for 7 minutes. Agarose electrophoresis was carried out, and staining was carried out with a DNA-staining agent. Then, whether or not amplification occurred by PCR was detected by UV irradiation. In addition, the chain length of the PCR product was compared with a DNA marker having a known size and simultaneously electrophoresed.

A plasmid vector pBR322 was cleaved with a restriction enzyme EcoRV (available from Takara Co., Ltd) and a gene fragment amplified by PCR was ligated at the cleavage site by using Ligation Kit (available from Promega Company). *Escherichia coli* DH5α strain was transformed with this reaction solution, and a transformant containing the plasmid in which the PCR-amplification product was cloned was selected. Moreover, the PCR amplification product was determined by DNA base sequencing.

A human CaSR-expression plasmid hCaSR/pcDNA3.1 was prepared by using this recombinant plasmid.

Test Example 2: Evaluation of CaSR Agonist Activity

In the presence of 200 μg/ml of G418 (Geneticin), 293E cells (EBNA1-expressing HEK293 cells, ATCC No. CRL-10852) were cultivated in DMEN/Ham's-F12 (Dulbecco's modified Eagle medium containing 3.15/mL of glucose, NACALAI TESQUE, Inc.) containing 10% fetal calf serum). The cells were seeded into a F25 flask at 3×10$^6$ cells/10 mL, and allowed to stand in a CO$_2$ incubator (5% CO$_2$, 37° C.) for 24 hours. Then, the cells were transfected with the human CaSR-expression plasmid hCaSR/pcDNA3.1 by using a transfection reagent Fugene6 (available from Roche Company). The cells were placed in a CO$_2$ incubator for 6 to 7 hours, and then the cells were harvested by using DMEM/Ham's-F12 containing 10% fetal calf serum. Then, the cells were seeded into a poly-D-lysine-coated 96-well plate (BD-Biocoat) at 70,000 cells/well.

The plate was allowed to stand over 24 hours in a CO$_2$ incubator, and then the culture medium was removed from the 96-well plate into which the cells were seeded. A Ca$^{2+}$ fluorescent indicator Calcium 4 Assay Kit (available from Molecular Devices Company) dissolved in an assay buffer (146 mM of NaCl, 5 mM of KCl, 1 mM of MgSO$_4$, 1 mg/mL of glucose, 20 mM of HEPES (pH 7.2) and 0.75 to 1.25 mM of CaCl$_2$) was added at 200 ft 1/well. Then, the indicator was incorporated into the cells by allowing the plate to stand at 37° C. for one hour, and then at room temperature for 10 minutes.

To the 96-well plate, each test compound dissolved in a 0.1% BSA-containing assay buffer was added at 50 ft 1/well, and the change in fluorescence intensity was measured for 3 minutes by using FLEX Station (available from Molecular Devices Company) and the EC$_{50}$ calculation method.

Method for the Determination of EC$_{50}$:

The differences between the maximum value and minimum value of the fluorescent intensity (RFU (Max-Min)) were determined by automatic calculation of FLEX Station before and after the addition of the compound. The percentage of activities was calculated, with the RFU (Max-Min) at the time when the maximum concentration of the compound added was defined to be 100%, and the RFU (Max-Min) at the time when the 0.1% BSA-containing assay buffer containing no test compound was defined to be 0%. Curve-fitting was carried out by using spreadsheet software Xfit or Graph-Pad-Prism, and the EC$_{50}$ value was determined, which is the concentration of the compound at which the percentage activity was 50%. The results are shown Table 1.

TABLE 1

| Compound | EC$_{50}$, μM |
|---|---|
| γ-Glu-Abu | 0.21 |
| γ-Glu-Ala | 1.24 |
| γ-Glu-Val | 1.03 |
| γ-Glu-tLeu | 3.06 |
| γ-Glu-Cys | 0.16 |
| γ-Glu-Ser | 11 |
| γ-Glu-Thr | 6.97 |
| γ-Glu-Aib | 15.4 |

Comparison of γ-Glu-Abu with other dipeptides shows that γ-Glu-Abu exhibits a strong CaSR effect and activity comparable to that of γ-Glu-Cys. It has been known that low molecular weight peptides having a CaSR effect and activity are useful as a kokumi-imparting agent (see Patent Document 1 specified above). Accordingly, it has been suggested that γ-Glu-Abu is a particularly excellent kokumi-imparting agent.

Example 1: Evaluation of Kokumi-Imparting Activity

The strength of the kokumi-imparting activity of γ-Glu-Abu was investigated based on a quantitative sensory evaluation test.

This quantitative sensory evaluation test was carried out as follows: The strength of the kokumi-imparting activity was measured for the cases where the test compound was mixed at concentrations of 0.001 to 0.5 g/dL with distilled water containing sodium glutamate (0.05 g/dL), inosine monophosphate (0.05 g/dL), and sodium chloride (0.5 g/dL). After the test compound was dissolved, samples more acidic than a control with no added test compound were adjusted, before further use, with NaOH to have a pH in a range of ±0.2 from the pH of the control with no added test compound. The sensory evaluation scores were as follows: control: 0 points; strong: 3 points; very strong: 5 points. The sensory evaluation was carried out using n (the number of panelists)=4. Moreover, to clarify the scale, the initial taste and the middle/after taste of γ-Glu-Val-Gly at 0.001 g/dL were both set as 3.0 points. The term "middle/after taste" refers to the taste perceived during the period which includes the middle taste and the after taste. For the scoring, a linear scale method was employed. In this method, the score was marked as a position on a straight line showing positions for scores ranging from −5~0~5. Moreover, the panelists were experienced persons who had been engaged in the development of seasonings for foods one year or longer in total, and who were capable of determining that the difference in the potency between γ-Glu-Cys-Gly and γ-Glu-Val-Gly each added to an umami and salty taste solution was about 10 times, while confirming the ability of these persons at regular intervals. The test compound exhibited a kokumi-imparting activity over a wide range of the above-described concentrations of addition. The results are shown in Table 2.

Table 2 also shows the results of evaluation of γ-Glu-Ala conducted in the same manner. The two were of the initial taste type, which had high scores for the initial taste. It has been found that γ-Glu-Abu is a dipeptide having an extremely high potency.

TABLE 2

| Comp. | Conc. (g/dL) | Strength of Kokumi Impartment | | Sensory Evaluation Profile |
|---|---|---|---|---|
| | | Initial Taste | Middle/After Taste | |
| γ-Glu-Abu | 0.005 | 3.8 | 3.2 | Thickness (the whole taste and the sense of fusion) was enhanced from the initial taste |
| γ-Glu-Ala | 0.2 | 4.5 | 4.3 | A taste similar to the sour and sweet tastes was mainly enhanced from the initial taste. |

Moreover, the strengths of kokumi-imparting activities of γ-Glu-Cys and other dipeptides were also investigated by the same quantitative sensory evaluation tests as described above. The results are shown in Table 3.

TABLE 3

| Comp. | Conc. (g/dL) | Strength of Kokumi Impartment | | Sensory Evaluation Profile |
|---|---|---|---|---|
| | | Initial Taste | Middle/After Taste | |
| γ-Glu-Cys | 0.01 | 3.1 | 3.1 | This middle-after tastes was dominant. Slight sulfur odor. |
| γ-Glu-Ser | 0.2 | 3.6 | 3.0 | This shows a strong initial taste, but emits some foreign tastes. |
| γ-Glu-Val | 0.01 | 3.1 | 2.4 | The after taste was extremely weak. |

Thus, it was found that γ-Glu-Abu has an excellent kokumi-imparting activity, and that the rising of the initial taste is excellent in its taste pattern. This rising of the initial taste is one of the extremely advantageous aspects over γ-Glu-Cys. In addition, γ-Glu-Abu is excellent in stability. This is also an advantageous aspect over γ-Glu-Cys. Moreover, since γ-Glu-Abu has as few as two amino acid residues, it can be more easily produced at a lower cost than tripeptides having three amino acid residues, And hence is advantageous from the industrial standpoint.

Example 2: Measurement of Strength of Kokumi-Imparting Activity

The intensity of the kokumi-imparting activity of γ-Glu-Abu was determined by Point of Subjective Equality (PSE) according to the limit-determining technique ("Statistical Sensory Examination techniques", written by SATO Shin, published by Japan Federation of Science and Technology).

The sensory evaluation was carried out as follows: Distilled water containing sodium glutamate (0.05 g/dL), inosine monophosphate (0.05 g/dL) and sodium chloride (0.5 g/dL) was used as the solution for the sensory evaluation. For comparison, γ-Glu-Val was used as a conventional dipeptide having a kokumi-imparting effect. γ-Glu-Cys also has a strong effect approximately the same as that of γ-Glu-Val, but has a different quality of taste from γ-Glu-Val, in that the initial taste of γ-Glu-Cys is not particularly strong. γ-Glu-Ala has a lower strength than γ-Glu-Val, and is difficult to use because of the strong sour taste, which necessitates adjusting the pH. γ-Glu-Ser also has a lower strength than γ-Glu-Val, and it is difficult to use because of the generation of a strange flavor.

To determine the concentration of γ-Glu-Val at which the strength of taste is the same as that of a solution obtained by causing the solution for the sensory evaluation to contain 0.005 g/dL of γ-Glu-Abu, γ-Glu-Val solutions were prepared with a concentration that varied on a 50% logarithmic scale by using a solution obtained by causing the solution for the sensory evaluation, to contain 0.01 g/dL of γ-Glu-Val as a standard. The concentrations of γ-Glu-Val was set to 7 values ranging from 0.0030 to 0.0337 g/dL. After the test substance was dissolved, samples more acidic than the control with no added test substance were adjusted, before further use, with NaOH to have a pH in a range of ±0.2 as compared to the pH of the control with no added test substance. The solutions were presented to eighteen panelists in ascending order of the γ-Glu-Val concentration. The evaluation was carried out until each panelist perceived that the strength was higher than that of the 0.005 g/dL γ-Glu-Abu solution. After a certain interval, the solutions were next presented to the eighteen panelists in descending order of the γ-Glu-Val concentration. The evaluation was carried out until each panelist perceived that the strength was lower than that of the 0.005 g/dL γ-Glu-Abu solution.

In this sensory evaluation, the panelists were experienced in the development of food products. The results are shown in Table 4.

TABLE 4

| Number of Panelists used for Each γ-Glu-Val Concentration: | | | |
|---|---|---|---|
| Change in Stimn. Conc. of γ-Glu-Val (g/dL) | No. of Panelists whose evaluation was such that γ-Glu-Val was stronger than γ-Glu-Abu (0.0050 g/dL) | No. of Panelists whose evaluation was such that the difference between γ-Glu-Val and of γ-Glu-Abu (0.0050 g/dL) was uncertain (No. of panelists) | No. of Panelists whose evaluation was such that γ-Glu-Val was weaker than γ-Glu-Abu (0.0050 g/dL) (No. of panelists) |
| 0.0030 | 0 | 0 | 36 |
| 0.0044 | 1 | 0 | 35 |
| 0.0067 | 3 | 13 | 20 |
| 0.0100 | 11 | 13 | 12 |

TABLE 4-continued

Number of Panelists used for Each γ-Glu-Val Concentration:

| Change in Stimn. Conc. of γ-Glu-Val (g/dL) | No. of Panelists whose evaluation was such that γ-Glu-Val was stronger than γ-Glu-Abu (0.0050 g/dL) | No. of Panelists whose evaluation was such that the difference between γ-Glu-Val and of γ-Glu-Abu (0.0050 g/dL) was uncertain (No. of panelists) | No. of Panelists whose evaluation was such that γ-Glu-Val was weaker than γ-Glu-Abu (0.0050 g/dL) (No. of panelists) |
|---|---|---|---|
| 0.0150 | 25 | 6 | 5 |
| 0.0225 | 28 | 7 | 1 |
| 0.0337 | 36 | 0 | 0 |

TABLE 5

Lower threshold and upper threshold at which each panelist determined that the concentrations were the same

| Panelist No. | Method of Presentation* | Lower Threshold (ppm) | Upper Threshold (ppm) |
|---|---|---|---|
| 1 | ↑ | 55.5 | 55.5 |
| 2 | ↑ | 83.5 | 83.5 |
| 3 | ↑ | 55.5 | 125.0 |
| 4 | ↑ | 55.5 | 125.0 |
| 5 | ↑ | 55.5 | 125.0 |
| 6 | ↑ | 125.0 | 187.5 |
| 7 | ↑ | 37.0 | 37.0 |
| 8 | ↑ | 55.5 | 125.0 |
| 9 | ↑ | 55.5 | 125.0 |
| 10 | ↑ | 125.0 | 281.0 |
| 11 | ↑ | 55.5 | 55.5 |
| 12 | ↑ | 55.5 | 83.5 |
| 13 | ↑ | 83.5 | 125.0 |
| 14 | ↑ | 83.5 | 83.5 |
| 15 | ↑ | 125.0 | 125.0 |
| 16 | ↑ | 187.5 | 281.0 |
| 17 | ↑ | 55.5 | 281.0 |
| 18 | ↑ | 83.5 | 83.5 |
| 19 | ↓ | 125.0 | 125.0 |
| 20 | ↓ | 83.5 | 125.0 |
| 21 | ↓ | 187.5 | 281.0 |
| 22 | ↓ | 83.5 | 187.5 |
| 23 | ↓ | 83.5 | 83.5 |
| 24 | ↓ | 55.5 | 83.5 |
| 25 | ↓ | 83.5 | 125.0 |
| 26 | ↓ | 55.5 | 281.0 |
| 27 | ↓ | 55.5 | 125.0 |
| 28 | ↓ | 187.5 | 281.0 |
| 29 | ↓ | 187.5 | 187.5 |
| 30 | ↓ | 55.5 | 125.0 |
| 31 | ↓ | 125.0 | 125.0 |
| 32 | ↓ | 83.5 | 125.0 |
| 33 | ↓ | 56.0 | 83.5 |
| 34 | ↓ | 281.0 | 281.0 |
| 35 | ↓ | 55.5 | 83.5 |
| 36 | ↓ | 125.0 | 281.0 |
| Confidence Region (average) | — | 94.5 | 149.3 |
| PSE | | 121.9 | |

*Presentation method, ↑ indicates that the presentation was conducted in ascending order of the concentration, and ↓ indicates that the presentation was conducted in descending order of the concentration.

When the lower and upper threshold values were the same, there was no γ-Glu-Val concentration at which the difference between the perception that the strength was lower, and the perception that the strength was higher, was uncertain. For example, the evaluations of Panelist No. 1 were such that the strength was lower at 44 ppm (0.0044 g/dL) of γ-Glu-Val, and that the strength was higher at 67 ppm (0.0067 g/dL). Hence, the lower threshold and upper threshold values were the same at 55.5 ppm.

Each confidence threshold (average) is an average of the lower thresholds and the upper thresholds.

The point of subjective equality (PSE) of γ-Glu-Val to 50 ppm (0.0050 g/dL) of γ-Glu-Abu is expressed as follows: (the sum of the confidence threshold of the lower thresholds and that of the upper threshold value)/2.

The γ-Glu-Val concentration of (PSE) which has the same strength as that of 0.0050 g/dL of γ-Glu-Abu is estimated to be 0.0100 g/dL, based on the number of panelists shown in Table 4. From the upper and lower threshold concentrations of γ-Glu-Val at which the individual panelists made the evaluation that the strengths were equal, is the PSE can be calculated to be 0.0122 g/dL. The strength of γ-Glu-Abu is approximately 2.4 times higher than that of γ-Glu-Val, indicating that γ-Glu-Abu is a dipeptide having extremely high strength. γ-Glu-Abu can be said to be an important dipeptide which is capable of exhibiting the kokumi from the initial taste for a wide variety of foods at a cost lower than that of conventional cases.

Example 3: Evaluation of Salty Taste Enhancement

The salty taste enhancement of γ-Glu-Abu was investigated by a quantitative sensory evaluation test.

The sensory evaluation test was carried out as follows: A test compound in a seemingly optimum amount was added to distilled water containing sodium chloride (0.5 g/dL), and the strength of the salty taste was measured. After the test compound was dissolved, samples more acidic than a control containing no added test compound were adjusted, before further use, with NaOH to have a pH in a range of ±0.2 from the pH of the control to which no test compound was added.

The sensory evaluation scores were as follows, the control to which no test compound was added, i.e. a 0.5 g/dL sodium chloride solution: 0 points; a 0.75 g/dL sodium chloride solution: 5 points. The sensory evaluation was conducted on a scale ranging from −5 to 0 to 5, with n=5. The "initial taste" refers to the taste perceived by each panelist from the start of eating the sample to 2 seconds thereafter, while the term "middle/after taste" refers to that perceived by each panelist from 2 seconds on and after eating the same, i.e. perceived during the period including both the middle taste and the after taste. For the scoring, a linear scale method was used. In this method, the score was marked as a position on a straight line showing positions for scores ranging from −5~0~5. The panelists were persons who were engaged in the development of seasonings for foods for one year or longer in total, and who were capable of determining that the difference in the potency between γ-Glu-Cys-Gly and γ-Glu-Val-Gly each added to a umami taste and salty taste solution was around 10 times, while confirming the ability of these persons at regular intervals. The results are shown in Table 6.

TABLE 6

| | | Strength of Salty Taste Impartment | | |
|---|---|---|---|---|
| Comp. | Conc. (g/dL) | Initial Taste | Middle/ After Taste | Sensory Evaluation Profile |
| γ-Glu-Abu | 0.004 | 1.6 | 1.5 | The salty taste was enhanced from the initial taste period and sharpness of salty taste was also imparted. |
| γ-Glu-Val-Gly | 0.002 | 0.8 | 1.8 | The taste was no longer of the initial taste type. |

A comparison was made between γ-Glu-Val-Gly, which is a tripeptide having a high kokumi-imparting potency, and γ-Glu-Abu, which is a dipeptide, in terms of the salty taste enhancement ability. Based on the evaluation concentrations and evaluation scores, γ-Glu-Val-Gly has a higher taste-imparting strength than γ-Glu-Abu. However, as described in the sensory evaluation profile, γ-Glu-Val-Gly remarkably disturbs the balance of the salty taste. On the other hand, γ-Glu-Abu shows extremely well balanced salty taste enhancement, and hence is particularly suitable as a peptide for salty taste enhancement.

Example 4: Evaluation of Use in Combination with an Organic Acid

The improvement in the salty taste effect of γ-Glu-Abu by the use of an organic acid in combination was investigated by a quantitative sensory evaluation test.

The sensory evaluation tests were carried out as follows. Low salt "Whole Chicken Stock" commercially available from Ajinomoto Co., Ltd., was dissolved in boiling water so that a common salt concentration of 0.48 g/dL was achieved. A test compound in an appropriate amount was dissolved in the solution, and the salty taste strength was measured. No pH adjustment is necessary, such as the lowering of the pH, because there is no difference in pH between the solution after dissolving each test compound and the control without any added compound. In addition, no influence due to the sour taste or the like was observed in the sensory evaluation. To clarify the scale, the sensory evaluation scores were set as follows: the salty taste of the control: 3 points; the salty taste of a soup with increased salt concentration by 1.25 times as compared to that of control: 4 points; and the salty taste of a soup with increased salt concentration by 1.5 times as compared to that of the control: 5 points. The sensory evaluation was carried out using a panel of n (the number of panelists)=6. For the scoring a linear scale method was used. In this method, the score was marked as a position on a straight line showing positions for scores ranging from 1~3~5. The panelists used in this test were persons who had been engaged in the development of seasonings for foods for at least one year or longer in total, and who were capable of determining that the difference in potency between γ-Glu-Cys-Gly and γ-Glu-Val-Gly each added to an umami and salty taste solution was around 10 times, while confirming the ability of these persons at regular intervals. The results are summarized in Table 7.

TABLE 7

| Compound | | Conc. (g/dL) | Str. of Salty Taste (score) | Sensory Evaluation Profile |
|---|---|---|---|---|
| γ-Glu-Abu | | 0.0040 | 3.56 | The initial taste of the salty taste was enhanced. |
| Combined Use 1 | γ-Glu-Abu Lactic acid | 0.0040 0.0300 | 3.92 | The initial taste of the salty taste was enhanced, and the overall thickness of the soup was improved. |
| Combined Use 2 | γ-Glu-Abu Malic acid | 0.0040 0.0300 | 3.76 | The salty taste was enhanced from the initial taste to the after taste. The thickness of the soup as a whole was improved. |

Lactic acid or malic acid, which are organic acids, matches extremely well with γ-Glu-Abu, and it has been found that the use of an organic acid such as lactic acid or malic acid in combination further improves the salty taste enhancement effect of γ-Glu-Abu.

In other words, the effect of γ-Glu-Abu enhancing the salty taste in a well-balanced manner can further be improved by the use of an organic acid in combination with the dipeptide. Accordingly, γ-Glu-Abu is an extremely useful compound whose effect can be reinforced by an inexpensive and commonly used material.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in their entireties.

What is claimed is:

1. A kokumi-imparting agent comprising, in combination,
   (a) γ-Glu-Abu; and
   (b) peptides selected from the group consisting of γ-Glu-X-Gly wherein X represents an amino acid or an amino acid derivative, γ-Glu-Val-Y wherein Y represents an amino acid or an amino acid derivative, γ-Glu-Ala, γ-Glu-Gly, γ-Glu-Cys, γ-Glu-Met, γ-Glu-Thr, γ-Glu-Val, γ-Glu-Orn, Asp-Gly, Cys-Gly, Cys-Met, Glu-Cys, Gly-Cys, Leu-Asp, D-Cys, γ-Glu-Met (O), γ-Glu-γ-Glu-Val, γ-Glu-Val-NH$_2$, γ-Glu-Val-ol, γ-Glu-Ser, γ-Glu-Tau, γ-Glu-Cys (S-Me) (O), γ-Glu-Leu, γ-Glu-Ile, γ-Glu-t-Leu, γ-Glu-Cys (S-Me), and combinations thereof;
   wherein γ-Glu-Abu is present in said agent in an amount of not less than 1,000 ppm by mass.

2. A seasoning composition comprising not less than 2,500 ppm by mass of γ-Glu-Abu, and one or more additional ingredients selected from the group consisting of flavors, saccharides, sweeteners, dietary fibers, vitamins, amino acids, nucleic acids, and organic acids; or salts thereof.

3. A method for preparing a food, drink, or an intermediate product which is useful for the preparation of a food or drink comprising
   A) adding an ingredient for food or drink, wherein said ingredient comprises γ-Glu-Abu in an amount of not less than 1000 ppm by mass, to one or more other ingredients for food or drink, resulting in a mixture; and
   B) optionally cooking the mixture.

4. The method as set forth in claim 3, wherein step A) further comprises controlling the concentration of γ-Glu-Abu in the mixture so that the mixture comprises γ-Glu-Abu in an amount ranging from 400 to 500,000 ppm by mass, and wherein the mixture is an intermediate product which is useful for the preparation of a food or drink.

5. The method as set forth in claim 3, further comprising the step of controlling the concentration of γ-Glu-Abu in the food or drink to a level ranging from 20 to 200 ppm by mass.

6. The method for preparing a food or drink as set forth in claim 3, wherein step A) further comprises controlling the concentration of γ-Glu-Abu in the food or drink to a level ranging from 20 to 200 ppm by mass.

7. The method as set forth in claim 3, wherein the food or drink is a low salt food or drink.

8. The method as set forth in claim 7, wherein it further comprises the step of adding, to the mixture, an organic acid or salt thereof selected from the group consisting of lactic acid, citric acid, malic acid, succinic acid and combinations thereof, and salts thereof, so that the concentration thereof in the mixture is from 0.005 to 0.1% by mass.

9. A food, a drink or an intermediate product which is useful for preparing a food or drink which is obtainable by the method as set forth in claim 3.

10. A food, a drink or an intermediate product which is useful for preparing a food or drink comprising:
    A) 20 to 200 ppm by mass of γ-Glu-Abu;
    B) 0.005 to 0.1% by mass of an organic acid or a salt thereof selected from the group consisting of lactic acid, citric acid, malic acid succinic acid and combinations thereof;
    C) 0.01 to 0.5% by mass of a common salt,
    D) a carrier acceptable for foods and drinks and/or one or at least two seasoning ingredients.

11. A method for enhancing the flavor and/or the taste of a food or a drink comprising incorporating, into a food or a drink, a composition which comprises not less than 400 ppm by mass of γ-Glu-Abu.

12. The method as set forth in claim 11, wherein said enhancing is imparting kokumi to the food or drink.

13. A method of imparting kokumi on a food or drink comprising the step of adding a composition comprising not less than 1,000 ppm of γ-Glu-Abu.

14. A food or drink comprising 20 to 200 ppm by mass of γ-Glu-Abu and 0.01 to 0.5% by mass of a common salt.

* * * * *

SEQUENCE LISTING

```
<160> NUMBER OF SEQ ID NOS: 4

<210> SEQ ID NO 1
<211> LENGTH: 4924
<212> TYPE: DNA
<213> ORGANISM: Homo sapiens
<220> FEATURE:
<221> NAME/KEY: CDS
<222> LOCATION: (373)..(3609)

<400> SEQUENCE: 1
caacaggcac ctggctgcag ccaggaagga ccgcacgccc tttcgcgcag gagagtggaa      60
ggagggagct gtttgccagc accgaggtct tgcggcacag gcaacgcttg acctgagtct     120
tgcagaatga aaggcatcac aggaggcctc tgcatgatgt ggcttccaaa gactcaagga    180
ccacccacat tacaagtctg gattgaggaa ggcagaaatg gagattcaaa caccacgtct    240
tctattattt tattaatcaa tctgtagaca tgtgtcccca ctgcagggag tgaactgctc    300
caagggagaa acttctggga gcctccaaac tcctagctgt ctcatccctt gccctggaga    360
gacggcagaa cc atg gca ttt tat agc tgc tgc tgg gtc ctc ttg gca ctc    411
              Met Ala Phe Tyr Ser Cys Cys Trp Val Leu Leu Ala Leu
                1               5                  10
```

-continued

| | | |
|---|---|---|
| acc tgg cac acc tct gcc tac ggg cca gac cag cga gcc caa aag aag<br>Thr Trp His Thr Ser Ala Tyr Gly Pro Asp Gln Arg Ala Gln Lys Lys<br>15                    20                  25 | | 459 |
| ggg gac att atc ctt ggg ggg ctc ttt cct att cat ttt gga gta gca<br>Gly Asp Ile Ile Leu Gly Gly Leu Phe Pro Ile His Phe Gly Val Ala<br>30                    35                  40                  45 | | 507 |
| gct aaa gat caa gat ctc aaa tca agg ccg gag tct gtg gaa tgt atc<br>Ala Lys Asp Gln Asp Leu Lys Ser Arg Pro Glu Ser Val Glu Cys Ile<br>                50                  55                  60 | | 555 |
| agg tat aat ttc cgt ggg ttt cgc tgg tta cag gct atg ata ttt gcc<br>Arg Tyr Asn Phe Arg Gly Phe Arg Trp Leu Gln Ala Met Ile Phe Ala<br>65                    70                  75 | | 603 |
| ata gag gag ata aac agc agc cca gcc ctt ctt ccc aac ttg acg ctg<br>Ile Glu Glu Ile Asn Ser Ser Pro Ala Leu Leu Pro Asn Leu Thr Leu<br>        80                  85                  90 | | 651 |
| gga tac agg ata ttt gac act tgc aac acc gtt tct aag gcc ttg gaa<br>Gly Tyr Arg Ile Phe Asp Thr Cys Asn Thr Val Ser Lys Ala Leu Glu<br>95                    100               105 | | 699 |
| gcc acc ctg agt ttt gtt gct caa aac aaa att gat tct ttg aac ctt<br>Ala Thr Leu Ser Phe Val Ala Gln Asn Lys Ile Asp Ser Leu Asn Leu<br>110                115               120              125 | | 747 |
| gat gag ttc tgc aac tgc tca gag cac att ccc tct acg att gct gtg<br>Asp Glu Phe Cys Asn Cys Ser Glu His Ile Pro Ser Thr Ile Ala Val<br>                130               135              140 | | 795 |
| gtg gga gca act ggc tca ggc gtc tcc acg gca gtg gca aat ctg ctg<br>Val Gly Ala Thr Gly Ser Gly Val Ser Thr Ala Val Ala Asn Leu Leu<br>                145               150              155 | | 843 |
| ggg ctc ttc tac att ccc cag gtc agt tat gcc tcc tcc agc aga ctc<br>Gly Leu Phe Tyr Ile Pro Gln Val Ser Tyr Ala Ser Ser Ser Arg Leu<br>                160               165              170 | | 891 |
| ctc agc aac aag aat caa ttc aag tct ttc ctc cga acc atc ccc aat<br>Leu Ser Asn Lys Asn Gln Phe Lys Ser Phe Leu Arg Thr Ile Pro Asn<br>175              180               185 | | 939 |
| gat gag cac cag gcc act gcc atg gca gac atc atc gag tat ttc cgc<br>Asp Glu His Gln Ala Thr Ala Met Ala Asp Ile Ile Glu Tyr Phe Arg<br>190                195               200              205 | | 987 |
| tgg aac tgg gtg ggc aca att gca gct gat gac gac tat ggg cgg ccg<br>Trp Asn Trp Val Gly Thr Ile Ala Ala Asp Asp Asp Tyr Gly Arg Pro<br>                210               215              220 | | 1035 |
| ggg att gag aaa ttc cga gag gaa gct gag gaa agg gat atc tgc atc<br>Gly Ile Glu Lys Phe Arg Glu Glu Ala Glu Glu Arg Asp Ile Cys Ile<br>                225               230              235 | | 1083 |
| gac ttc agt gaa ctc atc tcc cag tac tct gat gag gaa gag atc cag<br>Asp Phe Ser Glu Leu Ile Ser Gln Tyr Ser Asp Glu Glu Glu Ile Gln<br>                240               245              250 | | 1131 |
| cat gtg gta gag gtg att caa aat tcc acg gcc aaa gtc atc gtg gtt<br>His Val Val Glu Val Ile Gln Asn Ser Thr Ala Lys Val Ile Val Val<br>255              260               265 | | 1179 |
| ttc tcc agt ggc cca gat ctt gag ccc ctc atc aag gag att gtc cgg<br>Phe Ser Ser Gly Pro Asp Leu Glu Pro Leu Ile Lys Glu Ile Val Arg<br>270              275               280              285 | | 1227 |
| cgc aat atc acg ggc aag atc tgg ctg gcc agc gag gcc tgg gcc agc<br>Arg Asn Ile Thr Gly Lys Ile Trp Leu Ala Ser Glu Ala Trp Ala Ser<br>                290               295              300 | | 1275 |
| tcc tcc ctg atc gcc atg cct cag tac ttc cac gtg gtt ggc ggc acc<br>Ser Ser Leu Ile Ala Met Pro Gln Tyr Phe His Val Val Gly Gly Thr<br>                305               310              315 | | 1323 |
| att gga ttc gct ctg aag gct ggg cag atc cca ggc ttc cgg gaa ttc<br>Ile Gly Phe Ala Leu Lys Ala Gly Gln Ile Pro Gly Phe Arg Glu Phe<br>320              325               330 | | 1371 |

-continued

| | |
|---|---|
| ctg aag aag gtc cat ccc agg aag tct gtc cac aat ggt ttt gcc aag<br>Leu Lys Lys Val His Pro Arg Lys Ser Val His Asn Gly Phe Ala Lys<br>335                  340                  345 | 1419 |
| gag ttt tgg gaa gaa aca ttt aac tgc cac ctc caa gaa ggt gca aaa<br>Glu Phe Trp Glu Glu Thr Phe Asn Cys His Leu Gln Glu Gly Ala Lys<br>350                  355                  360                  365 | 1467 |
| gga cct tta cct gtg gac acc ttt ctg aga ggt cac gaa gaa agt ggc<br>Gly Pro Leu Pro Val Asp Thr Phe Leu Arg Gly His Glu Glu Ser Gly<br>                370                  375                  380 | 1515 |
| gac agg ttt agc aac agc tcg aca gcc ttc cga ccc ctc tgt aca ggg<br>Asp Arg Phe Ser Asn Ser Ser Thr Ala Phe Arg Pro Leu Cys Thr Gly<br>385                  390                  395 | 1563 |
| gat gag aac atc agc agt gtc gag acc cct tac ata gat tac acg cat<br>Asp Glu Asn Ile Ser Ser Val Glu Thr Pro Tyr Ile Asp Tyr Thr His<br>                400                  405                  410 | 1611 |
| tta cgg ata tcc tac aat gtg tac tta gca gtc tac tcc att gcc cac<br>Leu Arg Ile Ser Tyr Asn Val Tyr Leu Ala Val Tyr Ser Ile Ala His<br>415                  420                  425 | 1659 |
| gcc ttg caa gat ata tat acc tgc tta cct ggg aga ggg ctc ttc acc<br>Ala Leu Gln Asp Ile Tyr Thr Cys Leu Pro Gly Arg Gly Leu Phe Thr<br>430                  435                  440                  445 | 1707 |
| aat ggc tcc tgt gca gac atc aag aaa gtt gag gcg tgg cag gtc ctg<br>Asn Gly Ser Cys Ala Asp Ile Lys Lys Val Glu Ala Trp Gln Val Leu<br>                450                  455                  460 | 1755 |
| aag cac cta cgg cat cta aac ttt aca aac aat atg ggg gag cag gtg<br>Lys His Leu Arg His Leu Asn Phe Thr Asn Asn Met Gly Glu Gln Val<br>                465                  470                  475 | 1803 |
| acc ttt gat gag tgt ggt gac ctg gtg ggg aac tat tcc atc atc aac<br>Thr Phe Asp Glu Cys Gly Asp Leu Val Gly Asn Tyr Ser Ile Ile Asn<br>480                  485                  490 | 1851 |
| tgg cac ctc tcc cca gag gat ggc tcc atc gtg ttt aag gaa gtc ggg<br>Trp His Leu Ser Pro Glu Asp Gly Ser Ile Val Phe Lys Glu Val Gly<br>                495                  500                  505 | 1899 |
| tat tac aac gtc tat gcc aag aag gga gaa aga ctc ttc atc aac gag<br>Tyr Tyr Asn Val Tyr Ala Lys Lys Gly Glu Arg Leu Phe Ile Asn Glu<br>510                  515                  520                  525 | 1947 |
| gag aaa atc ctg tgg agt ggg ttc tcc agg gag gtg ccc ttc tcc aac<br>Glu Lys Ile Leu Trp Ser Gly Phe Ser Arg Glu Val Pro Phe Ser Asn<br>                530                  535                  540 | 1995 |
| tgc agc cga gac tgc ctg gca ggg acc agg aaa ggg atc att gag ggg<br>Cys Ser Arg Asp Cys Leu Ala Gly Thr Arg Lys Gly Ile Ile Glu Gly<br>                545                  550                  555 | 2043 |
| gag ccc acc tgc tgc ttt gag tgt gtg gag tgt cct gat ggg gag tat<br>Glu Pro Thr Cys Cys Phe Glu Cys Val Glu Cys Pro Asp Gly Glu Tyr<br>560                  565                  570 | 2091 |
| agt gat gag aca gat gcc agt gcc tgt aac aag tgc cca gat gac ttc<br>Ser Asp Glu Thr Asp Ala Ser Ala Cys Asn Lys Cys Pro Asp Asp Phe<br>575                  580                  585 | 2139 |
| tgg tcc aat gag aac cac acc tcc tgc att gcc aag gag atc gag ttt<br>Trp Ser Asn Glu Asn His Thr Ser Cys Ile Ala Lys Glu Ile Glu Phe<br>590                  595                  600                  605 | 2187 |
| ctg tcg tgg acg gag ccc ttt ggg atc gca ctc acc ctc ttt gcc gtg<br>Leu Ser Trp Thr Glu Pro Phe Gly Ile Ala Leu Thr Leu Phe Ala Val<br>                610                  615                  620 | 2235 |
| ctg ggc att ttc ctg aca gcc ttt gtg ctg ggt gtg ttt atc aag ttc<br>Leu Gly Ile Phe Leu Thr Ala Phe Val Leu Gly Val Phe Ile Lys Phe<br>                625                  630                  635 | 2283 |
| cgc aac aca ccc att gtc aag gcc acc aac cga gag ctc tcc tac ctc<br>Arg Asn Thr Pro Ile Val Lys Ala Thr Asn Arg Glu Leu Ser Tyr Leu<br>640                  645                  650 | 2331 |

-continued

| | | |
|---|---|---|
| ctc ctc ttc tcc ctg ctc tgc tgc ttc tcc agc tcc ctg ttc ttc atc<br>Leu Leu Phe Ser Leu Leu Cys Cys Phe Ser Ser Ser Leu Phe Phe Ile<br>655                      660                    665 | 2379 |
| ggg gag ccc cag gac tgg acg tgc cgc ctg cgc cag ccg gcc ttt ggc<br>Gly Glu Pro Gln Asp Trp Thr Cys Arg Leu Arg Gln Pro Ala Phe Gly<br>670                      675                    680                    685 | 2427 |
| atc agc ttc gtg ctc tgc atc tca tgc atc ctg gtg aaa acc aac cgt<br>Ile Ser Phe Val Leu Cys Ile Ser Cys Ile Leu Val Lys Thr Asn Arg<br>                    690                    695                    700 | 2475 |
| gtc ctc ctg gtg ttt gag gcc aag atc ccc acc agc ttc cac cgc aag<br>Val Leu Leu Val Phe Glu Ala Lys Ile Pro Thr Ser Phe His Arg Lys<br>705                      710                    715 | 2523 |
| tgg tgg ggg ctc aac ctg cag ttc ctg ctg gtt ttc ctc tgc acc ttc<br>Trp Trp Gly Leu Asn Leu Gln Phe Leu Leu Val Phe Leu Cys Thr Phe<br>720                      725                    730 | 2571 |
| atg cag att gtc atc tgt gtg atc tgg ctc tac acc gcg ccc ccc tca<br>Met Gln Ile Val Ile Cys Val Ile Trp Leu Tyr Thr Ala Pro Pro Ser<br>735                      740                    745 | 2619 |
| agc tac cgc aac cag gag ctg gag gat gag atc atc ttc atc acg tgc<br>Ser Tyr Arg Asn Gln Glu Leu Glu Asp Glu Ile Ile Phe Ile Thr Cys<br>750                      755                    760                    765 | 2667 |
| cac gag ggc tcc ctc atg gcc ctg ggc ttc ctg atc ggc tac acc tgc<br>His Glu Gly Ser Leu Met Ala Leu Gly Phe Leu Ile Gly Tyr Thr Cys<br>                    770                    775                    780 | 2715 |
| ctg ctg gct gcc atc tgc ttc ttc ttt gcc ttc aag tcc cgg aag ctg<br>Leu Leu Ala Ala Ile Cys Phe Phe Phe Ala Phe Lys Ser Arg Lys Leu<br>785                      790                    795 | 2763 |
| ccg gag aac ttc aat gaa gcc aag ttc atc acc ttc agc atg ctc atc<br>Pro Glu Asn Phe Asn Glu Ala Lys Phe Ile Thr Phe Ser Met Leu Ile<br>800                      805                    810 | 2811 |
| ttc ttc atc gtc tgg atc tcc ttc att cca gcc tat gcc agc acc tat<br>Phe Phe Ile Val Trp Ile Ser Phe Ile Pro Ala Tyr Ala Ser Thr Tyr<br>815                      820                    825 | 2859 |
| ggc aag ttt gtc tct gcc gta gag gtg att gcc atc ctg gca gcc agc<br>Gly Lys Phe Val Ser Ala Val Glu Val Ile Ala Ile Leu Ala Ala Ser<br>830                      835                    840                    845 | 2907 |
| ttt ggc ttg ctg gcg tgc atc ttc ttc aac aag atc tac atc att ctc<br>Phe Gly Leu Leu Ala Cys Ile Phe Phe Asn Lys Ile Tyr Ile Ile Leu<br>                    850                    855                    860 | 2955 |
| ttc aag cca tcc cgc aac acc atc gag gag gtg cgt tgc agc acc gca<br>Phe Lys Pro Ser Arg Asn Thr Ile Glu Glu Val Arg Cys Ser Thr Ala<br>865                      870                    875 | 3003 |
| gct cac gct ttc aag gtg gct gcc cgg gcc acg ctg cgc cgc agc aac<br>Ala His Ala Phe Lys Val Ala Ala Arg Ala Thr Leu Arg Arg Ser Asn<br>880                      885                    890 | 3051 |
| gtc tcc cgc aag cgg tcc agc agc ctt gga ggc tcc acg gga tcc acc<br>Val Ser Arg Lys Arg Ser Ser Ser Leu Gly Gly Ser Thr Gly Ser Thr<br>895                      900                    905 | 3099 |
| ccc tcc tcc tcc atc agc agc aag agc aac agc gaa gac cca ttc cca<br>Pro Ser Ser Ser Ile Ser Ser Lys Ser Asn Ser Glu Asp Pro Phe Pro<br>910                      915                    920                    925 | 3147 |
| cag ccc gag agg cag aag cag cag ccg ctg gcc cta acc cag caa<br>Gln Pro Glu Arg Gln Lys Gln Gln Pro Leu Ala Leu Thr Gln Gln<br>                    930                    935                    940 | 3195 |
| gag cag cag cag cag ccc ctg acc ctc cca cag cag caa cga tct cag<br>Glu Gln Gln Gln Gln Pro Leu Thr Leu Pro Gln Gln Gln Arg Ser Gln<br>                    945                    950                    955 | 3243 |
| cag cag ccc aga tgc aag cag aag gtc atc ttt ggc agc ggc acg gtc<br>Gln Gln Pro Arg Cys Lys Gln Lys Val Ile Phe Gly Ser Gly Thr Val<br>960                      965                    970 | 3291 |

| | | |
|---|---|---|
| acc ttc tca ctg agc ttt gat gag cct cag aag aac gcc atg gcc cac<br>Thr Phe Ser Leu Ser Phe Asp Glu Pro Gln Lys Asn Ala Met Ala His<br>    975                    980                  985 | 3339 |
| agg aat tct acg cac cag aac tcc ctg gag gcc cag aaa agc agc gat<br>Arg Asn Ser Thr His Gln Asn Ser Leu Glu Ala Gln Lys Ser Ser Asp<br>990                   995                 1000              1005 | 3387 |
| acg ctg acc cga cac cag cca tta ctc ccg ctg cag tgc ggg gaa<br>Thr Leu Thr Arg His Gln Pro Leu Leu Pro Leu Gln Cys Gly Glu<br>                1010                 1015              1020 | 3432 |
| acg gac tta gat ctg acc gtc cag gaa aca ggt ctg caa gga cct<br>Thr Asp Leu Asp Leu Thr Val Gln Glu Thr Gly Leu Gln Gly Pro<br>             1025                 1030                1035 | 3477 |
| gtg ggt gga gac cag cgg cca gag gtg gag gac cct gaa gag ttg<br>Val Gly Gly Asp Gln Arg Pro Glu Val Glu Asp Pro Glu Glu Leu<br>             1040                 1045                1050 | 3522 |
| tcc cca gca ctt gta gtg tcc agt tca cag agc ttt gtc atc agt<br>Ser Pro Ala Leu Val Val Ser Ser Ser Gln Ser Phe Val Ile Ser<br>             1055                 1060                1065 | 3567 |
| ggt gga ggc agc act gtt aca gaa aac gta gtg aat tca taa<br>Gly Gly Gly Ser Thr Val Thr Glu Asn Val Val Asn Ser<br>                1070                 1075 | 3609 |
| aatggaagga gaagactggg ctagggagaa tgcagagagg tttcttgggg tcccagggaa | 3669 |
| gaggaatcgc cccagactcc tttcctctga ggaagaaggg ataatagaca catcaaatgc | 3729 |
| cccgaattta gtcacaccat cttaaatgac agtgaattga cccatgttcc ctttaaaatt | 3789 |
| aaaaaaaaga agagccttgt gtttctgtgg ttgcatttgt caaagcattg agatctccac | 3849 |
| ggtcagattt gctgttcacc cacatctaat gtctcttcct ctgttctatc ccacccaaca | 3909 |
| gctcagagat gaaactatgg ctttaaacta ccctccagag tgtgcagact gatgggacat | 3969 |
| caaatttgcc accactagag ctgagagtct gaaagacaga atgtcaccag tcctgcccaa | 4029 |
| tgccttgaca acagactgaa ttttaaatgt tcacaacata aggagaatgt atctcctcct | 4089 |
| atttatgaaa accatatgat attttgtctc ctacctgctg ctgctattat gtaacatcca | 4149 |
| gaaggtttgc acccctccta taccatatgt ctgcttctgt ccaggacatg atactgatgc | 4209 |
| catgtttaga ttccaggatc acaagaatca cctcaaattg ttaggaaggg actgcataaa | 4269 |
| ccaatgagct gtatctgtaa ttaatattcc tatatgtagc tttatcctta ggaaaatgct | 4329 |
| tctgttgtaa tagtccatgg acaatataaa ctgaaaaatg tcagtctggt ttatataagg | 4389 |
| cagtattatt gagctctatt tccccacccc actatcctca ctcccataag ctaagcctta | 4449 |
| tgtgagcccc ttcagggact caagggtcca gaagtccctc ccatctctac cccaaagaat | 4509 |
| tcctgaagcc agatccaccc tatccctgta cagagtaagt tctcaattat tggcctgcta | 4569 |
| atagctgcta gggtaggaaa gcgtggttcc aagaaagatc caccctcaaa tgtcagagct | 4629 |
| atgttccctc cagcagtggt attaatactg ccggtcaccc aggctctgga gccagagaga | 4689 |
| cagaccgggg ttcaagccat ggcttcgtca tttgcaagct gagtgactgt aggcagggaa | 4749 |
| ccttaaccct ctctaagccac agcttcttca tcttaaaat aaggataata atcattcttt | 4809 |
| cccctcagag ctcttatgtg gattaaacga gataatgtat ataaagtact ttagcctggt | 4869 |
| acctagcaca caataagcat tcaataaata ttagttaata ttattaaaaa aaaaa | 4924 |

<210> SEQ ID NO 2
<211> LENGTH: 1078
<212> TYPE: PRT
<213> ORGANISM: Homo sapiens

<400> SEQUENCE: 2

```
Met Ala Phe Tyr Ser Cys Cys Trp Val Leu Leu Ala Leu Thr Trp His
1               5                   10                  15

Thr Ser Ala Tyr Gly Pro Asp Gln Arg Ala Gln Lys Lys Gly Asp Ile
            20                  25                  30

Ile Leu Gly Gly Leu Phe Pro Ile His Phe Gly Val Ala Ala Lys Asp
        35                  40                  45

Gln Asp Leu Lys Ser Arg Pro Glu Ser Val Glu Cys Ile Arg Tyr Asn
    50                  55                  60

Phe Arg Gly Phe Arg Trp Leu Gln Ala Met Ile Phe Ala Ile Glu Glu
65                  70                  75                  80

Ile Asn Ser Ser Pro Ala Leu Leu Pro Asn Leu Thr Leu Gly Tyr Arg
                85                  90                  95

Ile Phe Asp Thr Cys Asn Thr Val Ser Lys Ala Leu Glu Ala Thr Leu
            100                 105                 110

Ser Phe Val Ala Gln Asn Lys Ile Asp Ser Leu Asn Leu Asp Glu Phe
        115                 120                 125

Cys Asn Cys Ser Glu His Ile Pro Ser Thr Ile Ala Val Val Gly Ala
130                 135                 140

Thr Gly Ser Gly Val Ser Thr Ala Val Ala Asn Leu Leu Gly Leu Phe
145                 150                 155                 160

Tyr Ile Pro Gln Val Ser Tyr Ala Ser Ser Arg Leu Leu Ser Asn
                165                 170                 175

Lys Asn Gln Phe Lys Ser Phe Leu Arg Thr Ile Pro Asn Asp Glu His
            180                 185                 190

Gln Ala Thr Ala Met Ala Asp Ile Ile Glu Tyr Phe Arg Trp Asn Trp
        195                 200                 205

Val Gly Thr Ile Ala Ala Asp Asp Tyr Gly Arg Pro Gly Ile Glu
    210                 215                 220

Lys Phe Arg Glu Glu Ala Glu Glu Arg Asp Ile Cys Ile Asp Phe Ser
225                 230                 235                 240

Glu Leu Ile Ser Gln Tyr Ser Asp Glu Glu Ile Gln His Val Val
                245                 250                 255

Glu Val Ile Gln Asn Ser Thr Ala Lys Val Ile Val Phe Ser Ser
            260                 265                 270

Gly Pro Asp Leu Glu Pro Leu Ile Lys Glu Ile Val Arg Arg Asn Ile
        275                 280                 285

Thr Gly Lys Ile Trp Leu Ala Ser Glu Ala Trp Ala Ser Ser Ser Leu
    290                 295                 300

Ile Ala Met Pro Gln Tyr Phe His Val Val Gly Thr Ile Gly Phe
305                 310                 315                 320

Ala Leu Lys Ala Gly Gln Ile Pro Gly Phe Arg Glu Phe Leu Lys Lys
                325                 330                 335

Val His Pro Arg Lys Ser Val His Asn Gly Phe Ala Lys Glu Phe Trp
            340                 345                 350

Glu Glu Thr Phe Asn Cys His Leu Gln Glu Gly Ala Lys Gly Pro Leu
        355                 360                 365

Pro Val Asp Thr Phe Leu Arg Gly His Glu Glu Ser Gly Asp Arg Phe
    370                 375                 380

Ser Asn Ser Ser Thr Ala Phe Arg Pro Leu Cys Thr Gly Asp Glu Asn
385                 390                 395                 400

Ile Ser Ser Val Glu Thr Pro Tyr Ile Asp Tyr Thr His Leu Arg Ile
                405                 410                 415
```

```
Ser Tyr Asn Val Tyr Leu Ala Val Tyr Ser Ile Ala His Ala Leu Gln
            420                 425                 430

Asp Ile Tyr Thr Cys Leu Pro Gly Arg Gly Leu Phe Thr Asn Gly Ser
        435                 440                 445

Cys Ala Asp Ile Lys Lys Val Glu Ala Trp Gln Val Leu Lys His Leu
    450                 455                 460

Arg His Leu Asn Phe Thr Asn Asn Met Gly Glu Gln Val Thr Phe Asp
465                 470                 475                 480

Glu Cys Gly Asp Leu Val Gly Asn Tyr Ser Ile Ile Asn Trp His Leu
                485                 490                 495

Ser Pro Glu Asp Gly Ser Ile Val Phe Lys Glu Val Gly Tyr Tyr Asn
            500                 505                 510

Val Tyr Ala Lys Lys Gly Glu Arg Leu Phe Ile Asn Glu Glu Lys Ile
        515                 520                 525

Leu Trp Ser Gly Phe Ser Arg Glu Val Pro Phe Ser Asn Cys Ser Arg
        530                 535                 540

Asp Cys Leu Ala Gly Thr Arg Lys Gly Ile Ile Glu Gly Glu Pro Thr
545                 550                 555                 560

Cys Cys Phe Glu Cys Val Glu Cys Pro Asp Gly Glu Tyr Ser Asp Glu
                565                 570                 575

Thr Asp Ala Ser Ala Cys Asn Lys Cys Pro Asp Asp Phe Trp Ser Asn
            580                 585                 590

Glu Asn His Thr Ser Cys Ile Ala Lys Glu Ile Glu Phe Leu Ser Trp
        595                 600                 605

Thr Glu Pro Phe Gly Ile Ala Leu Thr Leu Phe Ala Val Leu Gly Ile
        610                 615                 620

Phe Leu Thr Ala Phe Val Leu Gly Val Phe Ile Lys Phe Arg Asn Thr
625                 630                 635                 640

Pro Ile Val Lys Ala Thr Asn Arg Glu Leu Ser Tyr Leu Leu Leu Phe
                645                 650                 655

Ser Leu Leu Cys Cys Phe Ser Ser Ser Leu Phe Phe Ile Gly Glu Pro
            660                 665                 670

Gln Asp Trp Thr Cys Arg Leu Arg Gln Pro Ala Phe Gly Ile Ser Phe
        675                 680                 685

Val Leu Cys Ile Ser Cys Ile Leu Val Lys Thr Asn Arg Val Leu Leu
        690                 695                 700

Val Phe Glu Ala Lys Ile Pro Thr Ser Phe His Arg Lys Trp Trp Gly
705                 710                 715                 720

Leu Asn Leu Gln Phe Leu Leu Val Phe Leu Cys Thr Phe Met Gln Ile
                725                 730                 735

Val Ile Cys Val Ile Trp Leu Tyr Thr Ala Pro Pro Ser Ser Tyr Arg
            740                 745                 750

Asn Gln Glu Leu Glu Asp Glu Ile Ile Phe Ile Thr Cys His Glu Gly
        755                 760                 765

Ser Leu Met Ala Leu Gly Phe Leu Ile Gly Tyr Thr Cys Leu Leu Ala
        770                 775                 780

Ala Ile Cys Phe Phe Phe Ala Phe Lys Ser Arg Lys Leu Pro Glu Asn
785                 790                 795                 800

Phe Asn Glu Ala Lys Phe Ile Thr Phe Ser Met Leu Ile Phe Phe Ile
                805                 810                 815

Val Trp Ile Ser Phe Ile Pro Ala Tyr Ala Ser Thr Tyr Gly Lys Phe
            820                 825                 830
```

Val Ser Ala Val Glu Val Ile Ala Ile Leu Ala Ala Ser Phe Gly Leu
            835                 840                 845

Leu Ala Cys Ile Phe Phe Asn Lys Ile Tyr Ile Ile Leu Phe Lys Pro
        850                 855                 860

Ser Arg Asn Thr Ile Glu Glu Val Arg Cys Ser Thr Ala Ala His Ala
865                 870                 875                 880

Phe Lys Val Ala Ala Arg Ala Thr Leu Arg Arg Ser Asn Val Ser Arg
                885                 890                 895

Lys Arg Ser Ser Ser Leu Gly Gly Ser Thr Gly Ser Thr Pro Ser Ser
            900                 905                 910

Ser Ile Ser Ser Lys Ser Asn Ser Glu Asp Pro Phe Pro Gln Pro Glu
            915                 920                 925

Arg Gln Lys Gln Gln Pro Leu Ala Leu Thr Gln Gln Glu Gln Gln
        930                 935                 940

Gln Gln Pro Leu Thr Leu Pro Gln Gln Arg Ser Gln Gln Gln Pro
945                 950                 955                 960

Arg Cys Lys Gln Lys Val Ile Phe Gly Ser Gly Thr Val Thr Phe Ser
                965                 970                 975

Leu Ser Phe Asp Glu Pro Gln Lys Asn Ala Met Ala His Arg Asn Ser
            980                 985                 990

Thr His Gln Asn Ser Leu Glu Ala Gln Lys Ser Ser Asp Thr Leu Thr
            995                 1000                1005

Arg His Gln Pro Leu Leu Pro Leu Gln Cys Gly Glu Thr Asp Leu
        1010                1015                1020

Asp Leu Thr Val Gln Glu Thr Gly Leu Gln Gly Pro Val Gly Gly
        1025                1030                1035

Asp Gln Arg Pro Glu Val Glu Asp Pro Glu Glu Leu Ser Pro Ala
        1040                1045                1050

Leu Val Val Ser Ser Ser Gln Ser Phe Val Ile Ser Gly Gly Gly
        1055                1060                1065

Ser Thr Val Thr Glu Asn Val Val Asn Ser
        1070                1075

<210> SEQ ID NO 3
<211> LENGTH: 49
<212> TYPE: DNA
<213> ORGANISM: Artificial
<220> FEATURE:
<223> OTHER INFORMATION: primer

<400> SEQUENCE: 3
actaatacga ctcactatag ggaccatggc attttatagc tgctgctgg                49

<210> SEQ ID NO 4
<211> LENGTH: 29
<212> TYPE: DNA
<213> ORGANISM: Artificial
<220> FEATURE:
<223> OTHER INFORMATION: primer

<400> SEQUENCE: 4
ttatgaattc actacgtttt ctgtaacag                                      29